(12) United States Patent  
Sager

(10) Patent No.: US 8,419,059 B2  
(45) Date of Patent: Apr. 16, 2013

(54) AIR-BAG

(75) Inventor: Claudia Sager, Stetten (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/123,832

(22) PCT Filed: Sep. 23, 2009

(86) PCT No.: PCT/GB2009/002265  
§ 371 (c)(1), (2), (4) Date: Apr. 12, 2011

(87) PCT Pub. No.: WO2010/043841  
PCT Pub. Date: Apr. 22, 2010

(65) Prior Publication Data  
US 2011/0227321 A1    Sep. 22, 2011

(30) Foreign Application Priority Data

Oct. 13, 2008   (EP) ................................ 08253329

(51) Int. Cl.  
*B60R 21/233* (2011.01)
(52) U.S. Cl.  
USPC .............................. 280/743.2; 280/742
(58) Field of Classification Search .............. 280/729, 280/739, 742, 743.1, 743.2  
See application file for complete search history.

(56) References Cited

U.S. PATENT DOCUMENTS

| | | | |
|---|---|---|---|
| 5,678,858 A * | 10/1997 | Nakayama et al. | 280/743.2 |
| 5,762,367 A * | 6/1998 | Wolanin | 280/736 |
| 5,997,037 A | 12/1999 | Hill et al. | |
| 6,241,283 B1 * | 6/2001 | Zarazua | 280/743.2 |
| 6,598,903 B2 * | 7/2003 | Okada et al. | 280/743.2 |
| 6,834,884 B2 * | 12/2004 | Gu | 280/729 |
| 7,195,281 B2 * | 3/2007 | Williams et al. | 280/743.2 |
| 7,380,822 B2 * | 6/2008 | Abe | 280/743.1 |
| 7,708,305 B2 * | 5/2010 | Ishiguro et al. | 280/729 |
| 2005/0194769 A1 * | 9/2005 | Abe | 280/729 |
| 2005/0225065 A1 * | 10/2005 | Fujll | 280/743.2 |

FOREIGN PATENT DOCUMENTS

| | | |
|---|---|---|
| DE | 19843456 A1 | 4/1999 |
| EP | 1279568 | 1/2003 |
| EP | 1481854 | 12/2004 |
| EP | 1481854 A1 * | 12/2004 |
| GB | 2331049 | 5/1999 |

OTHER PUBLICATIONS

International Search Report and Written Opinion of the ISA for PCT/GB2009/002265, ISA/EP, Rijswijk, NL, mailed Dec. 23, 2009.  
Extended European Search Report for priority application EP 08253329.0, established Mar. 12, 2009.

* cited by examiner

*Primary Examiner* — Joseph Rocca  
*Assistant Examiner* — Robert A Coker  
(74) *Attorney, Agent, or Firm* — Harness, Dickey & Pierce, P.L.C.

(57) ABSTRACT

An air-bag includes a rear panel and a front panel secured to one another to define an inflatable volume. A tether interconnects the panels and has an area of mechanical weakness provided by at least one line of slits or perforations. The tether has a first configuration in which the area of mechanical weakness is substantially intact, and is configured to adopt a second configuration via rupture of the area of mechanical weakness. The first configuration of the tether is effective, during inflation of the air-bag, to limit the maximum depth of the air-bag to a predetermined distance measured between the front and rear panels, and the second configuration is effective to allow an increase in the maximum depth of the air-bag beyond the predetermined distance.

30 Claims, 22 Drawing Sheets

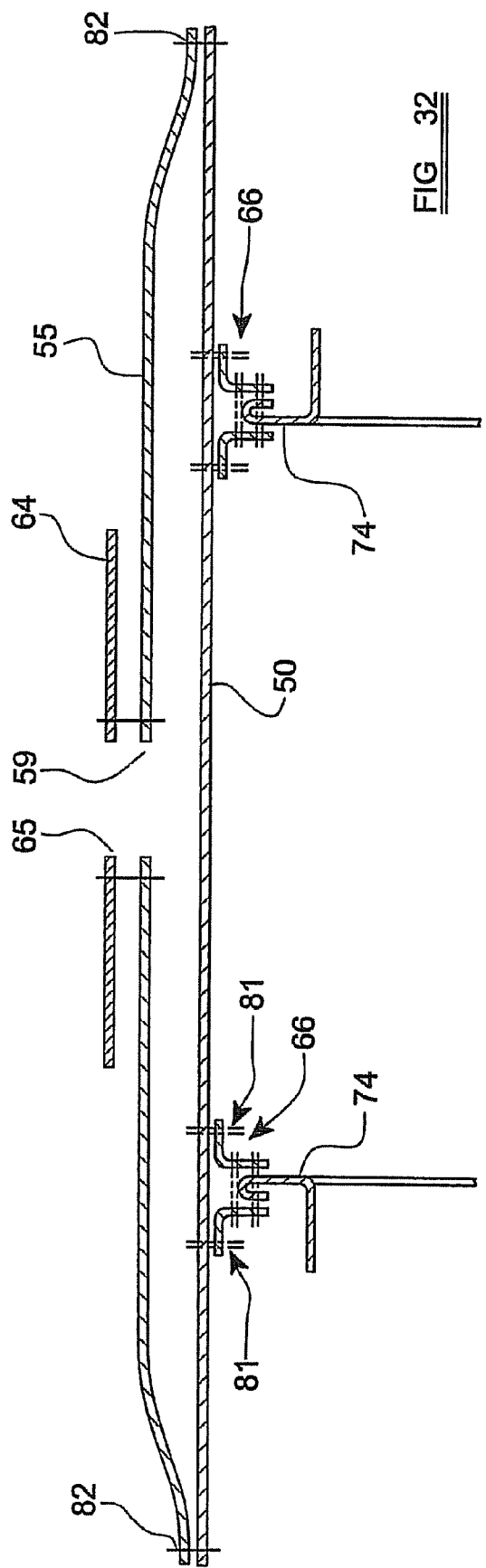
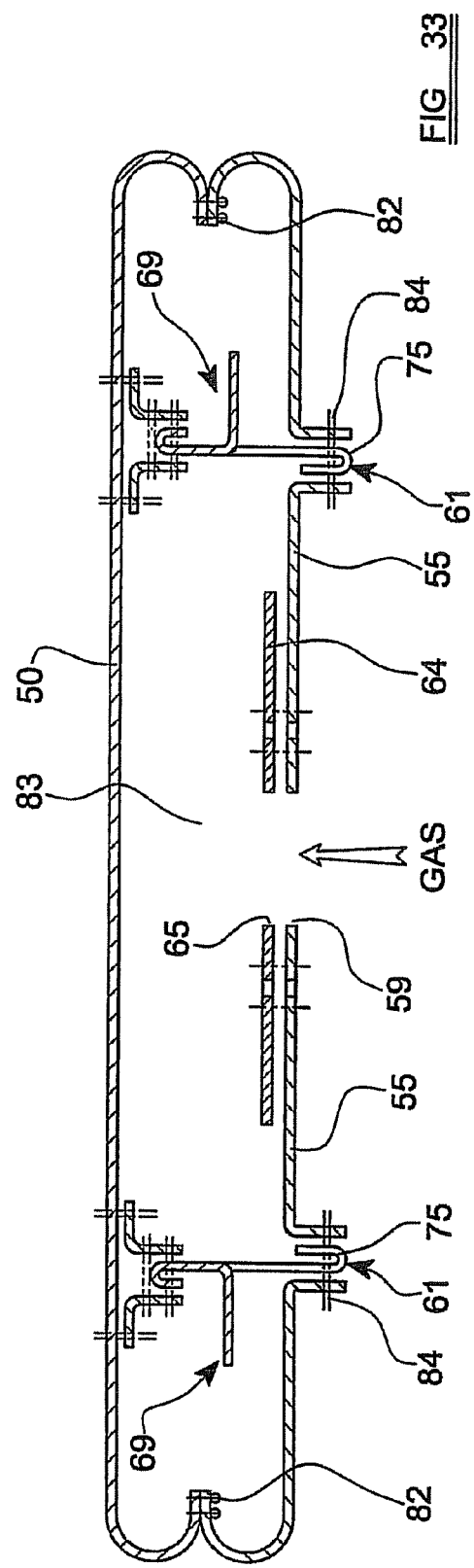

AIR-BAG

CROSS-REFERENCE TO RELATED APPLICATIONS

This application is a 371 U.S. National Stage of International Application No. PCT/GB2009/002265, filed Sep. 23, 2009, and published in English as WO 2010/043841 A1 on Apr. 22, 2010. This application claims the benefit of European Patent Application No. EP 08253329.0, filed Oct. 13, 2008. The disclosures of the above applications are incorporated herein by reference.

The present invention relates to an air-bag, and in particular an inflatable air-bag suitable for use as a safety device in a motor vehicle or the like.

It is now widely known to provide air-bag modules in motor vehicles as a form of safety device to protect an occupant of the vehicle in the event of a crash. Typical air-bag modules comprise an initially folded fabric air-bag and an inflator such as a gas generator. The gas generator is arranged to generate a large volume of gas very rapidly upon receipt of a signal from a sensor indicative of an actual or impending accident situation, so as to inflate the air-bag and provide a cushion for the protection of a vehicle occupant. For example, a frontal air-bag arrangement, when inflated, provides a cushion in front of a vehicle occupant to arrest forward inertial motion of the driver or passenger of the vehicle in a frontal impact collision.

The shape of the inflated cushion depends largely on the shape and construction of the panels of the air-bag, but can be further affected by the use of one or more tethers inside the air-bag. Tethers of this general type may be used to alter or carefully manage the shape of an air-bag during inflation.

It has also been proposed previously to use tethers in order to restrain or limit the extension of the air-bag at points where the tethers are attached to the fabric walls of the air-bag. One purpose for the use of tethers of this type is to prevent, or at least reduce the risk of, a concept commonly known as "bag-slap". This is a concept whereby, during deployment of an unrestrained air-bag into the passenger compartment of a motor vehicle, the outer face of the air-bag may extend outwardly beyond its normal reach for an instant before the air-bag becomes substantially fully inflated and adopts its fully inflated shape. The occurrence of this phenomenon can cause the outermost surface of the air-bag, which is typically the surface intended to be contacted by a vehicle occupant under the crash-inertia of the occupant, to slap an occupant. Injuries from "bag-slap" can be significant and so it is desirable to restrain the front panel of the air-bag sufficiently during inflation to prevent it from extending outwardly in this manner and slapping an occupant in the motor vehicle.

In order to address the problem of "bag-slap", it is also desirable to provide an air-bag which inflates in a generally radial manner very quickly, before achieving its full depth (as measured by the maximum distance between the front and rear panels of the inflated air-bag).

It is therefore an object of the present invention to provide an improved air-bag.

Accordingly, the present invention provides an air-bag comprising a rear panel and a front panel secured to one another to define an inflatable volume, the air-bag further comprising a tether interconnecting said panels and having an area of mechanical weakness, wherein the tether has a first configuration in which said area of mechanical weakness is substantially intact, and is configured to adopt a second configuration via rupture of said area of mechanical weakness, wherein said first configuration of the tether is effective, during inflation of the air-bag, to limit the maximum depth of the air-bag to a predetermined distance measured between the front and rear panels, and said second configuration is effective to allow an increase in the maximum depth of the air-bag beyond said predetermined distance.

Preferably, said area of mechanical weakness is configured to rupture in response to inflation of the air-bag to a predetermined internal pressure.

Advantageously, the tether is formed of fabric.

Conveniently, the area of mechanical weakness is defined by at least one line of slits or perforations.

Preferably, the tether comprises two spaced apart lines of slits or perforations.

Advantageously, said lines are substantially parallel to one another.

Conveniently, a pair of linear cuts are provided through the tether, each said cut being substantially collinear with a respective line of slits or perforations, so as to define a tab between said cuts and a respective lug to the other side of each cut, said tether being secured to one of said panels via the tab, and being secured to the other panel via said pair of lugs.

Preferably the tether comprises a line of slits or perforations extending transversely across a substantially central region of the tether so as to lie between a region of the tether connected to the front panel and a region of the tether connected to the rear panel.

Preferably, the air-bag comprises a plurality of said tethers.

Advantageously, each said tether is secured to a respective region of the rear panel, said regions of the rear panel being substantially equi-spaced from one another in a substantially regular array centred on a gas-inlet aperture provided in a central region of the rear panel.

Conveniently, each said tether is secured to a respective region of the front panel, said regions of the front panel being substantially equi-spaced from one another in a substantially regular array.

Preferably, said array of regions of the front panel substantially corresponds to said array of regions of the rear panel.

Advantageously, the air-bag comprises three said tethers.

Conveniently, a region of the tether located between said lines is secured to the front panel.

Preferably, said tether is formed integrally with at least a region of the rear panel.

Advantageously, said rear panel is formed by two interconnected sub-panels, said tether being formed integrally with a first of said sub-panels.

Conveniently, said lines of slits or perforations are provided through said first sub-panel.

Preferably, said lines of slits or perforations extend over a substantially central region of the first sub-panel between a pair of flaps cut from said first sub-panel, each said flap being turned behind said central region and secured relative to a gas-inlet aperture provided through the rear panel.

Advantageously, each said flap defines at least one gas-flow passage extending outwardly from said gas-inlet aperture in a direction substantially aligned with said lines of slits or perforations.

Conveniently, said tether forms a substantially central region of said first sub-panel, and wherein the second sub-panel is connected to said first sub-panel so as to extend across said central region of the first sub-panel.

Preferably, said gas-inlet aperture is provided through said second sub-panel.

Advantageously, said second sub-panel is connected to said first sub-panel via a pair of spaced apart lines of stitching, and wherein said lines of slits or perforations both lie between said lines of stitching, with each line of slits or perforations lying substantially adjacent a respective said line of stitching.

Conveniently, the or each tether is configured in its first configuration to act as a gas-deflector to the flow of entering the interior volume of the air-bag through a gas-inlet aperture provided through the rear panel.

Preferably, a region of the tether defined between said lines of slits or perforations overlies said gas-inlet aperture.

So that the invention may be more readily understood, and so that further features thereof may be appreciated, embodiments of the invention will now be described, by way of example, with reference to the accompanying drawings in which:

FIG. 32 is a schematic sectional view of the partially constructed air-bag illustrated in FIG. 31, taken along line E-E;

FIG. 33 is a view corresponding generally to that of FIG. 32, but shows the air-bag having been turned inside out;

An air-bag in accordance with a first embodiment of the present invention will now be described with particular reference to FIGS. 1-20, which illustrate the various component parts of the air-bag and a proposed method for creating the air-bag.

Figure 1:
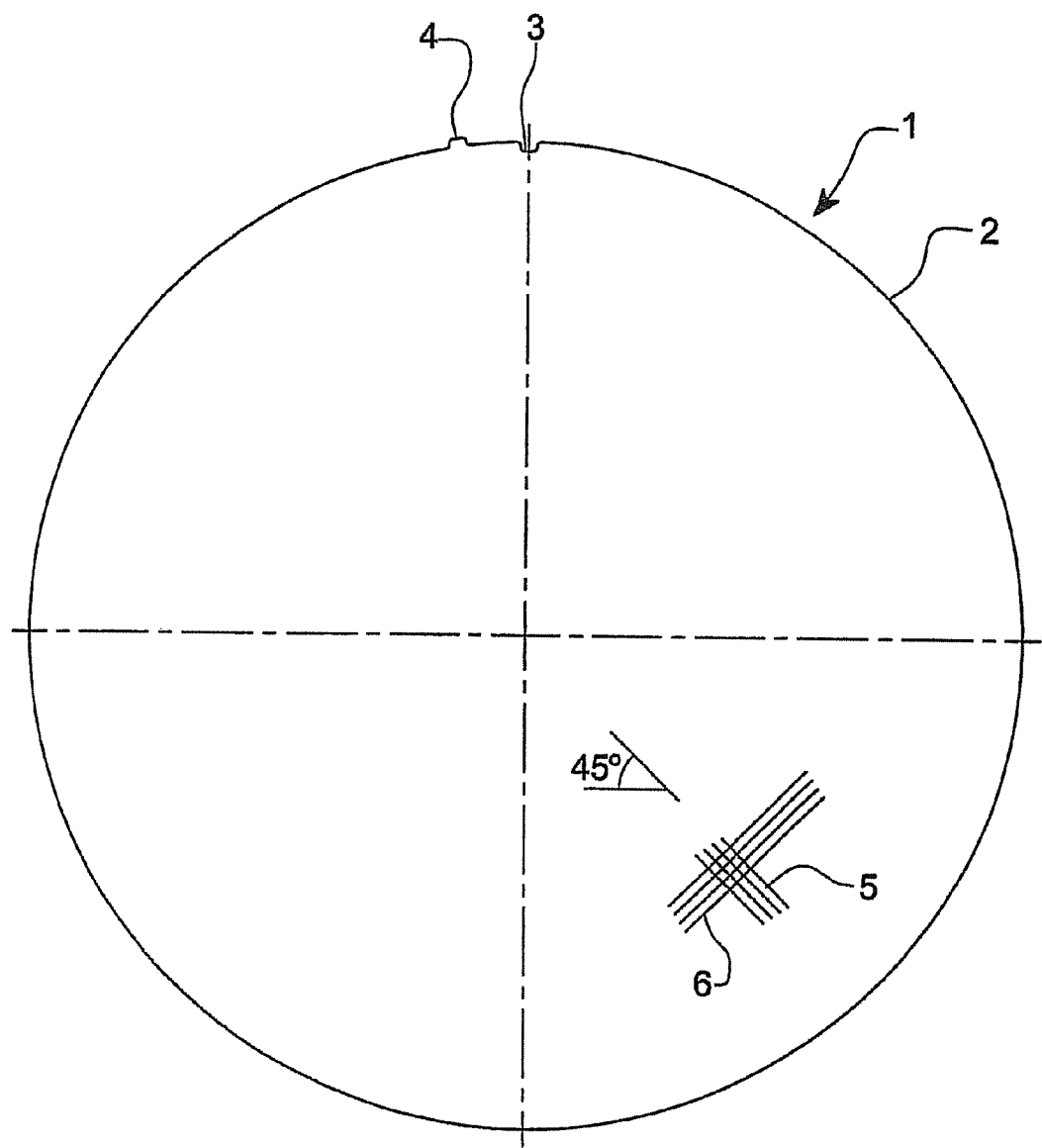
FIG. 1 shows a front panel of a first embodiment of the present invention.

Referring initially to FIG. 1, there is illustrated a front panel 1 of the air-bag which is cut from a layer of woven fabric so as to have a substantially circular configuration.

At a position around the peripheral edge 2 of the front panel 1, there is provided a small inwardly directed index notch 3 and a corresponding outwardly directed index projection 4, the purpose of which are to permit accurate alignment of the front panel with other component parts of the air-bag during manufacture, as will be described in more detail hereinafter.

With the front panel 1 oriented as shown in FIG. 1, with the index notch 3 vertically uppermost, the warp yarns 5 and the weft yarns 6 of the fabric make an angle of approximately 45° to the horizontal and vertical axes.

Figure 2:
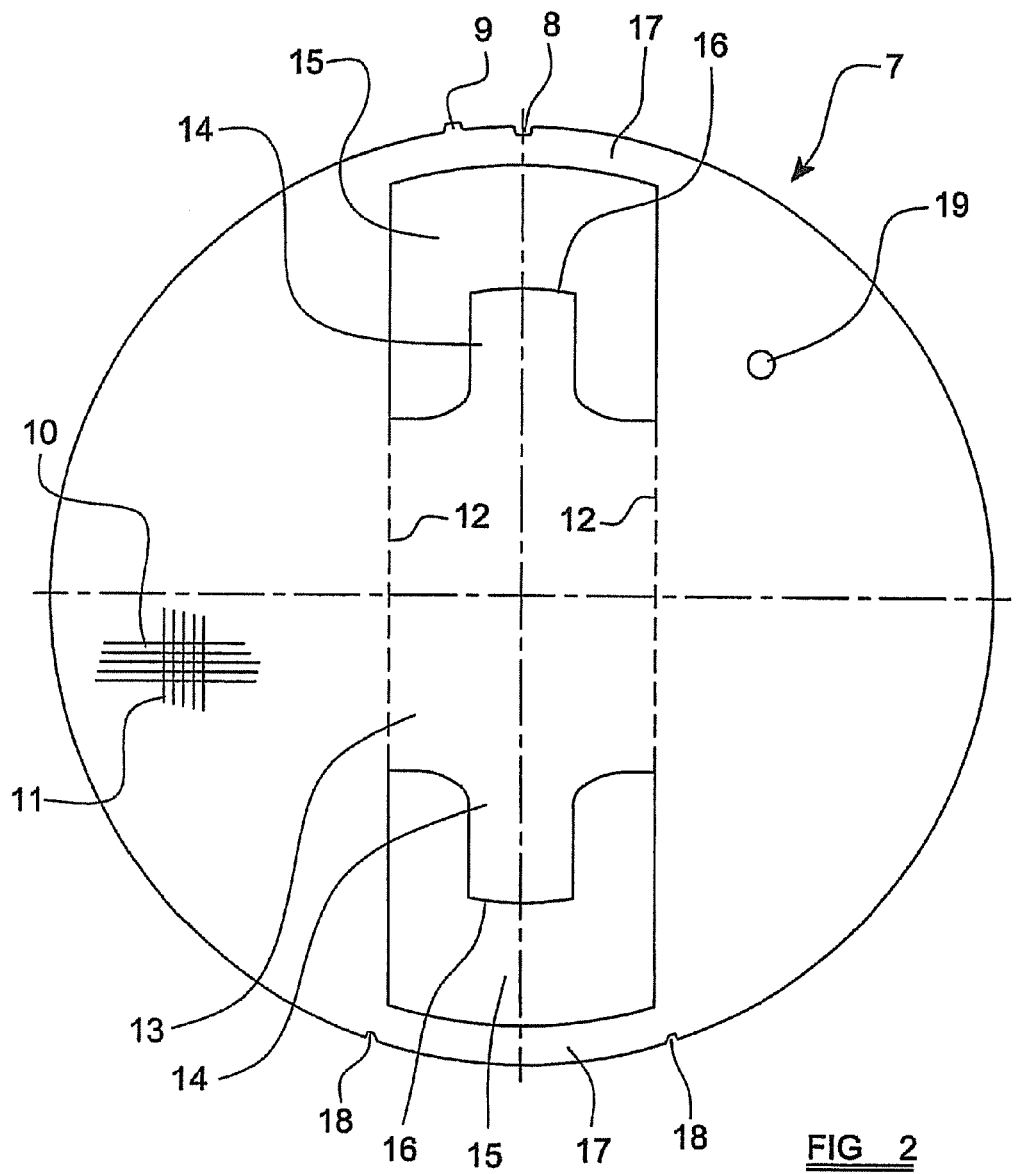
FIG. 2 shows a first sub-panel of the first embodiment which forms part of a rear panel of the air-bag.

FIG. 2 illustrates a first rear sub-panel 7 which is cut from woven sheet of fabric. The first sub-panel 7 is substantially circular in shape having a diameter substantially equal to that of the circular front panel 1 illustrated in FIG. 1. In a similar manner to the front panel 1, the first sub-panel 7 is provided with a small index notch 8 and a small index projection 9 at a predetermined position around its periphery. The index notch 8 of the first sub-panel 7 corresponds to the index notch 3 of the front panel 1, and the index projection 9 of the first sub-panel 7 corresponds to the index projection 4 of the front panel 1. The index notch 8 and index projection 9 of the first sub-panel 7 are spaced apart from one another by the same distance as the index notch 3 and index projection 4 of the front panel 1.

FIG. 2 shows the first rear sub-panel 7 oriented in a similar manner to the front panel 1 shown in FIG. 1, in which the index notch 8 is located vertically uppermost. In this orientation, the warp yarns 10 and the weft yarns 11 of the fabric forming the first sub-panel 7 are arranged so as to lie substantially parallel to the horizontal and vertical axes (or vice versa).

Two spaced apart lines of slits or perforations 12 are provided which extend over a substantially central region of the first sub-panel 7 and which define respective regions of mechanical weakness, along which the panel is configured to tear during inflation of the air-bag, as will be described in more detail hereinafter. It is envisaged that the slits or perforations can either be cut into the woven fabric of the first sub-panel 7, or alternatively could be formed integrally in the weave of the fabric.

A tether 13 is thus defined between the two spaced apart lines of slits or perforations 12 so as to be integral with the first sub-panel 7. The purpose of the tether 13 will become clear hereinafter. The tether 13 is substantially rectangular in form, but is provided with a pair of outwardly directed flaps 14, each of which extends outwardly (vertically upwardly and downwardly in the orientation illustrated in FIG. 2) from the central region defined between the lines of slits or perforations 12. Each flap 14 is actually formed by the removal of a generally U-shaped cut-out 15 of fabric. As can be seen clearly in FIG. 2, each flap 14 is substantially rectangular in form and terminates at a free edge 16 which is spaced inwardly of the peripheral edge of the first sub-panel 7. A thin web of fabric 17 remains adjacent the peripheral edge when the U-shaped cut-out 15 has been removed.

The first sub-panel 7 is provided with a pair of inwardly directed locating notches 18 at spaced apart positions around the periphery of the panel. In the orientation of the panel illustrated in FIG. 2, with the index notch 8 located vertically uppermost, the two locating notches 18 are located in a lower region of the panel, generally adjacent the lowermost cut-out 15, on opposite sides of the cut-out 15.

A small vent aperture 19 can be provided through the first sub-panel 7 in a manner known per se.

Figures 3, 4:
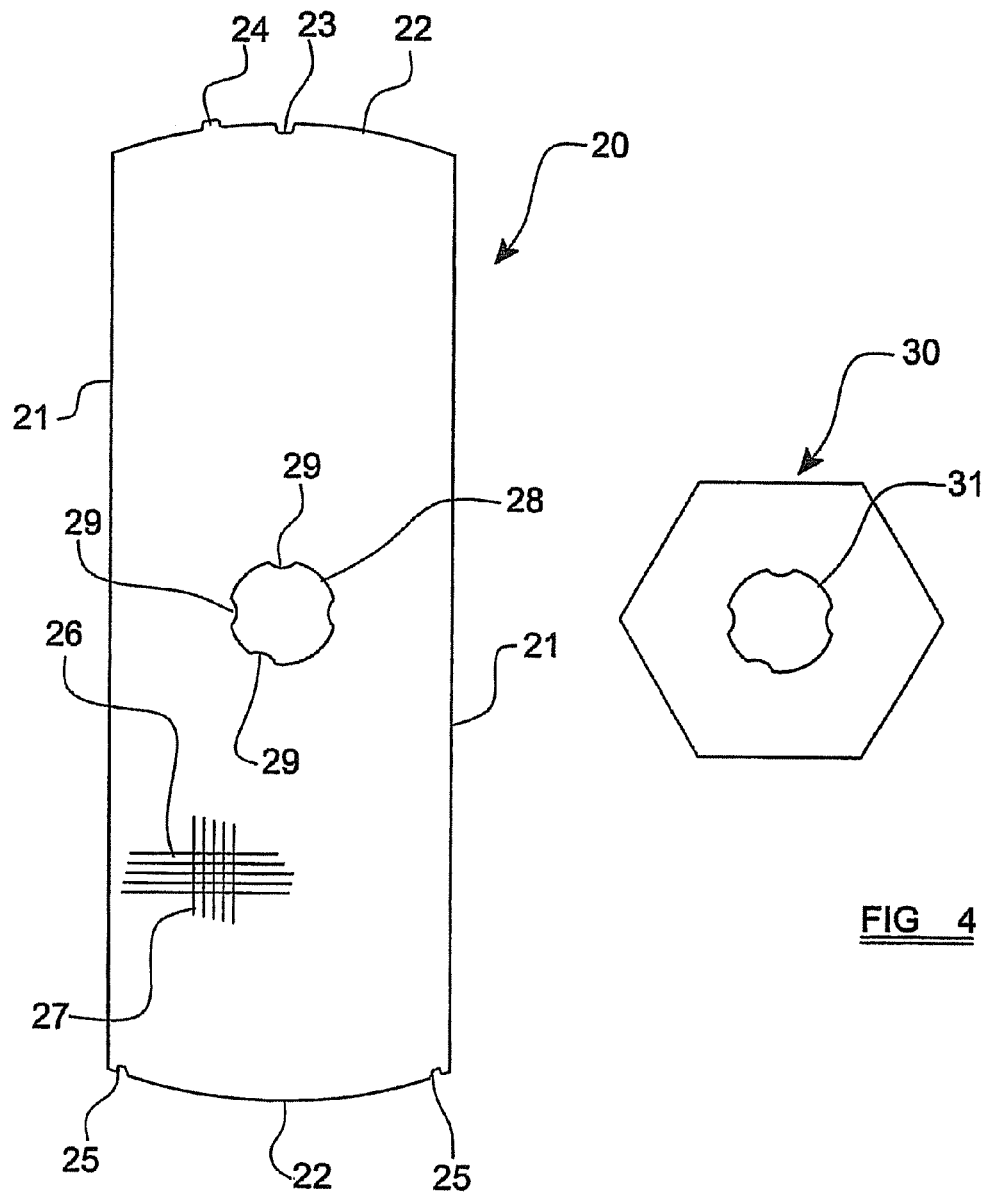
FIG. 3 shows a second sub-panel of the first embodiment which also forms part of the rear panel of the air-bag.
FIG. 4 shows a heat shield which forms part of the air-bag of the first embodiment.

FIG. 3 illustrates a second sub-panel 20 which is cut from woven fabric material and which is generally rectangular in form having a pair of substantially straight side edges 21 and a pair of arcuate end edges 22. The end edges 22 conform to the profile of the peripheral edge of the first sub-panel 7 illustrated in FIG. 2.

One of the end edges 22 of the second sub-panel 20 is provided with an index notch 23 and an index projection 24, both of which conform in shape and location to the corresponding index notches and index projections formed on the front panel 1 and the first sub-panel 7. The opposite end edge 22 is provided with a pair of locating notches 25 which correspond in shape and location to the locating notches 18 provided in the first sub-panel 7 illustrated in FIG. 2.

With the second sub-panel 20 oriented as shown in FIG. 3, with the index notch 23 located vertically uppermost, the warp yarns 26 of the fabric extend generally horizontally and the weft yarns 27 extend generally vertically (or vice versa) so as to correspond in orientation to the warp yarns 10 and weft yarns 11 of the first sub-panel 7 illustrated in FIG. 2.

A centrally located gas-inlet aperture 28 is formed through the fabric of the second sub-panel 20, the gas-inlet aperture being substantially circular in form but having an irregular arrangement of inwardly directed projections 29 to ensure correct alignment with a gas generator (not shown) in a manner known per se.

FIG. 4 illustrates a fabric heat shield 30 used in the construction of the air-bag of the first embodiment, the heat shield 30 being substantially hexagonal in form, and most preferably taking the form of a regular hexagon. However, it should be appreciated that the heat shield 30 can take other convenient forms. For example, the heat shield 30 could be cut so as to have a substantially square or rectangular form.

The heat shield 30 is provided with a gas-inlet aperture 31 through a central region, the gas-inlet aperture 31 corresponding in size and configuration to the gas-inlet aperture 28 formed through the second sub-panel 20 illustrated in FIG. 3.

Figure 5:
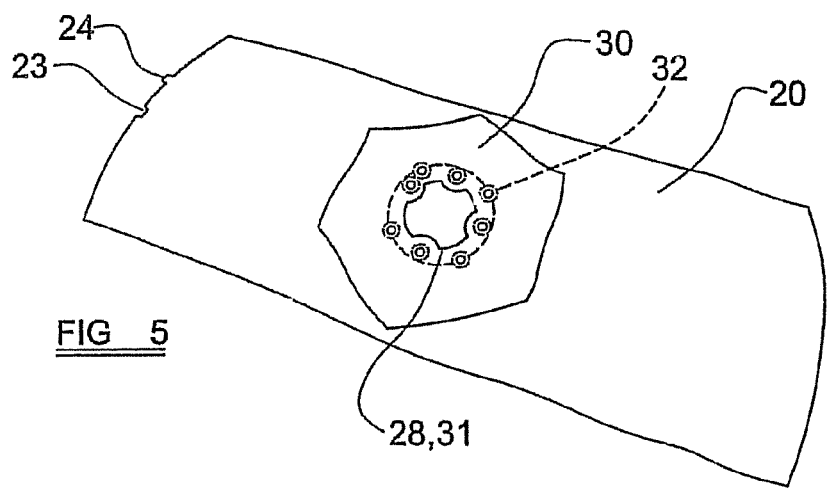
FIG. 5 shows the heat shield secured to the second sub-panel.

FIG. 5 illustrates an early stage during the construction of an air-bag in accordance with the first embodiment of the invention and shows the heat shield 30 superimposed over the second sub-panel 20. As can be seen, the second sub-panel 20 has first been overturned from the orientation illustrated in FIG. 3, and then the heat shield 30 has been positioned over the second sub-panel 20 with the gas-inlet apertures 31,28 of the two elements aligned. The heat shield 30 and the second sub-panel 20 are interconnected via a tortuous line of stitching 32 which runs around the outside of the aligned gas-inlet apertures 31,28 and which also runs around a plurality of gas generator mounting apertures, in a manner known per se.

In actual fact, FIG. 5 illustrates two superimposed heat shields 30 having been aligned with one another and secured to the second sub-panel 20 in this manner. It is preferred to use two heat shield elements in this way in order to provide a thickened region of fabric around the gas-inlet apertures, but for the sake of simplicity the further construction steps of the air-bag will be described with reference to there being only a single heat shield 30 secured to the second sub-panel 20.

Figure 6:
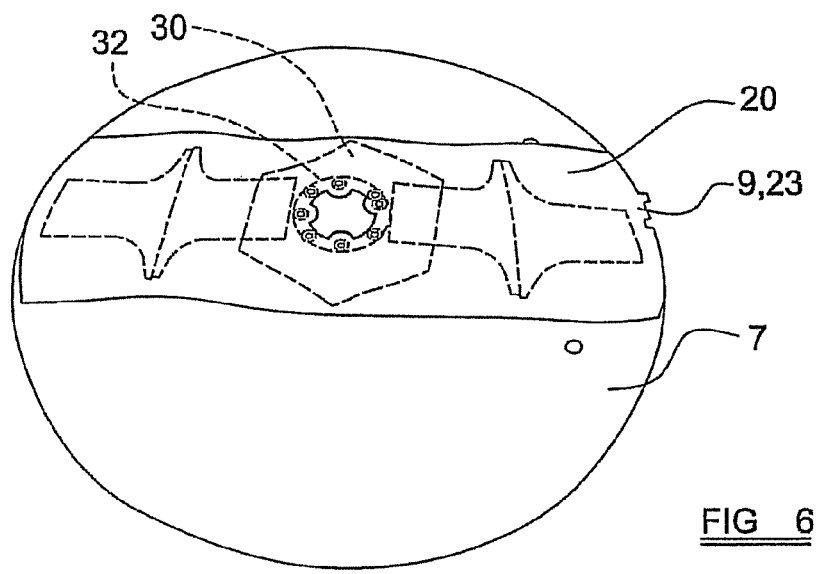
FIG. 6 shows the combination of the heat shield and second sub-panel illustrated in FIG. 5 in an overturned position aligned above the first sub-panel of FIG. 1, during a subsequent stage of construction of the air-bag.

FIG. 6 illustrates a subsequent construction stage in which the combination of the second sub-panel 20 and the heat shield 30 shown in FIG. 5 is overturned and superimposed on the first sub-panel 7 illustrated in FIG. 2. The second sub-panel 20/heat shield 30 combination is superimposed over the central region of the first sub-panel 7 such that the index notch 23 of the second sub-panel 20 is aligned with the corresponding index notch 8 of the first sub-panel 7, and such that the index projection 24 of the second sub-panel 20 is aligned with the corresponding index projection 9 of the first sub-panel 7.

Figure 7:
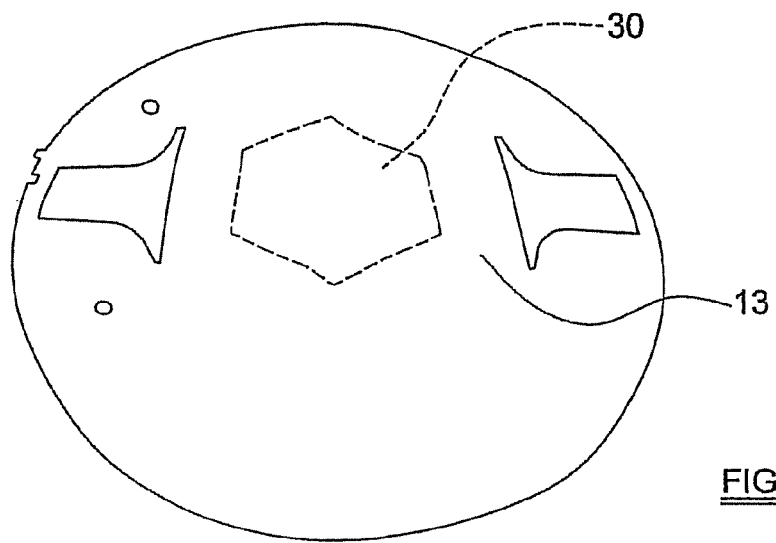
FIG. 7 shows the combination of panels illustrated in FIG. 6, but in an overturned orientation.
Figure 8:
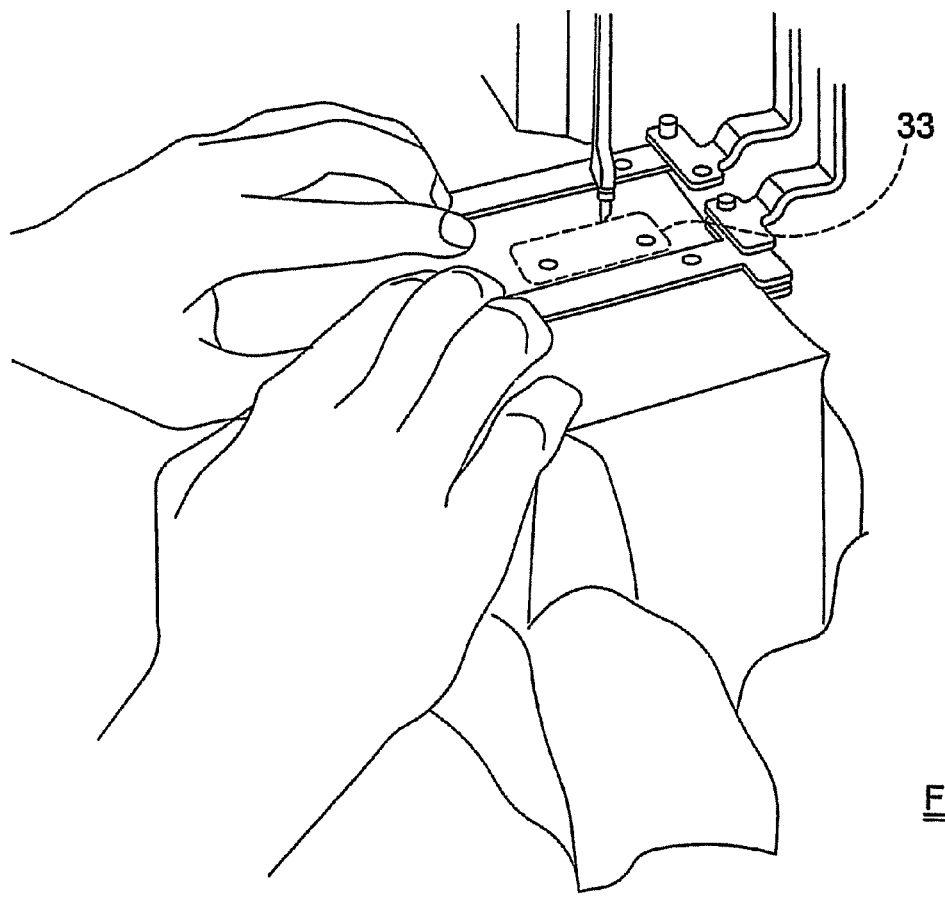
FIG. 8 illustrates the step of stitching together part of the first sub-panel illustrated in FIG. 2 and the heat shield illustrated in FIG. 4.

FIG. 7 illustrates the superimposed panels of FIG. 6 from below. As will we seen, the heat shield 30 is located between the second sub-panel 20 and the central tether region 13 of the first sub-panel 7. The two tether flaps 14 are then turned inwardly so that their ends 16 project into the space defined between the heat shield 30 and the second sub-panel 20. The tether flaps 14 are then each secured to the heat shield 30 by a box stitch 33 as shown in FIG. 8.

Figure 9:
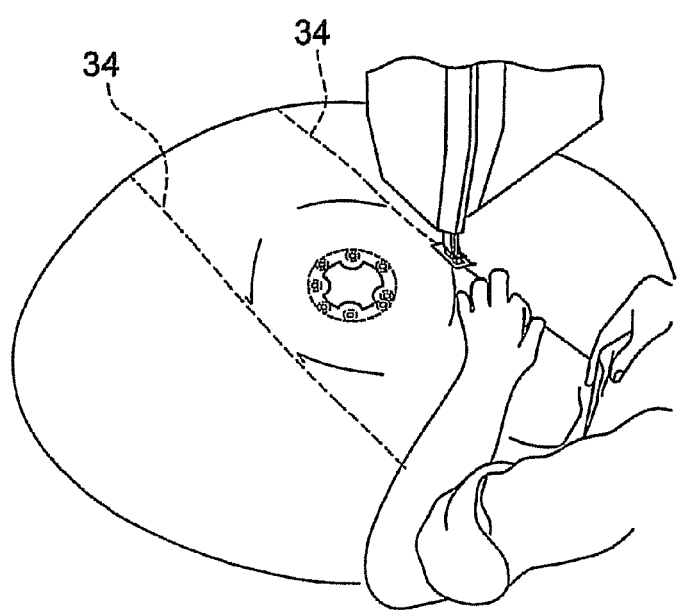
FIG. 9 illustrates a subsequent stage during the manufacture of the air-bag, showing the first and second sub-panels being stitched to one another to form a rear panel of the air-bag.

FIG. 9 shows the subsequent step of connecting the two sub-panels 7, 20 to one another, to form the rear panel of the airbag. This is done by the creation of lines of stitching 34 which run generally adjacent the straight side edges 21 of the second sub-panel 20 and the inwardly spaced lines of slits or perforations 12 of the first sub-panel 7.

Figure 10:
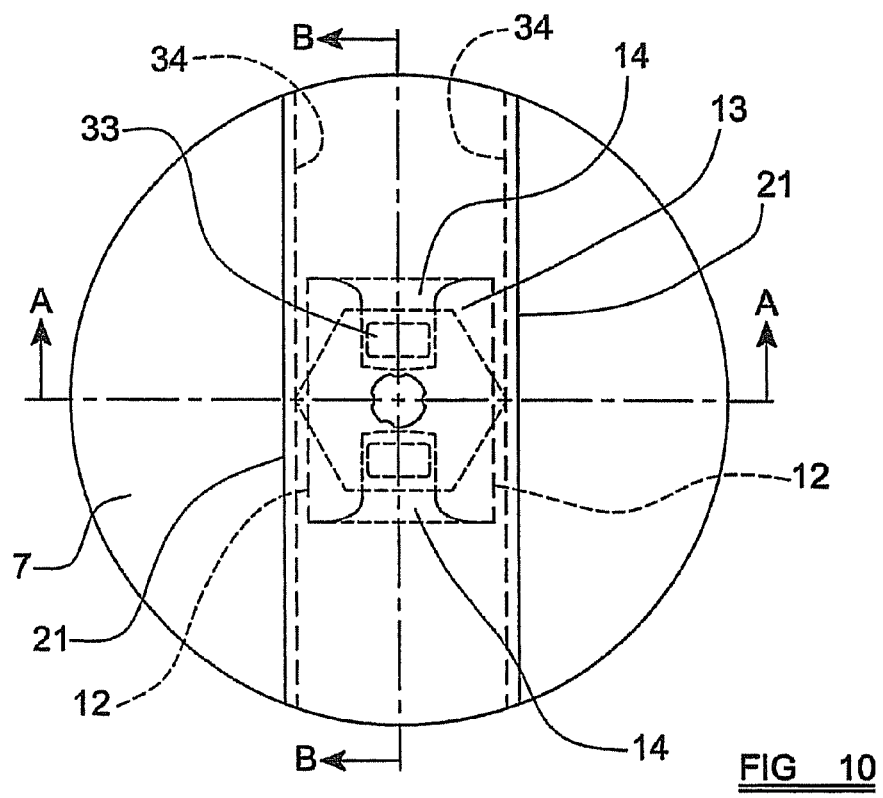
FIG. 10 is a part-sectional view illustrating the partially constructed air-bag resulting from the stitching step illustrated in FIG. 9.

FIG. 10 illustrates the resulting structure in a partially sectioned view with the inwardly turned tether flaps 14 clearly visible and showing the lines of stitching 34 extending parallel with and between the lines of slits or perforations 12 of the first sub-panel 7 and respective side edges 21 of the second sub-panel 20.

Figure 11:
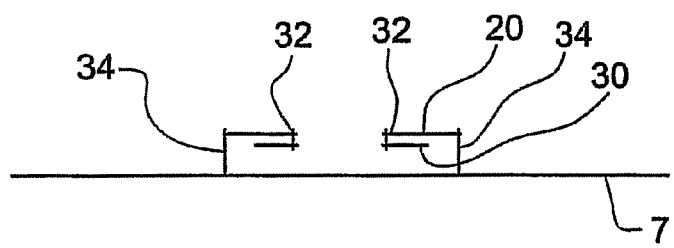
FIG. 11 is a schematic sectional view of the partially constructed air-bag taken along line A-A of FIG. 10.
Figure 12:
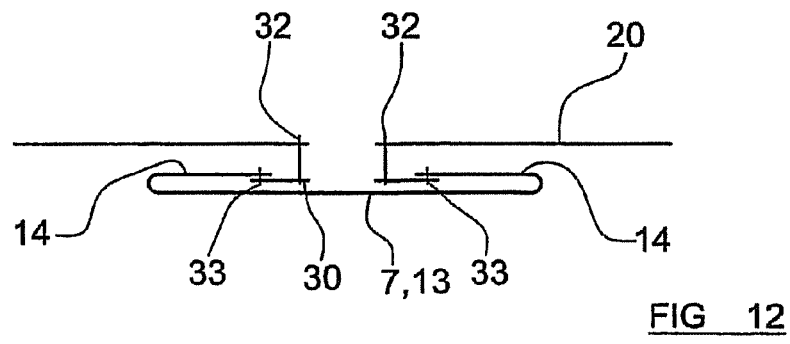
FIG. 12 is a schematic sectional view illustrating the partially constructed air-bag, taken along line B-B in FIG. 10.

FIG. 11 shows schematically the structure of FIG. 10 in transverse section through line A-A, and FIG. 12 shows schematically the structure along line B-B.

Figure 13:
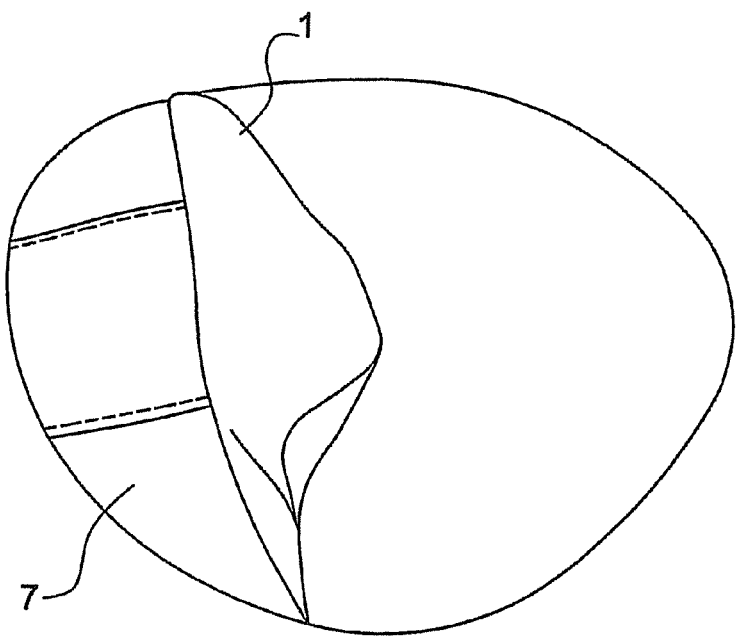
FIG. 13 illustrates a subsequent stage in the manufacture of the air-bag in which the front panel illustrated in FIG. 1 is superimposed on the rear panel illustrated in FIGS. 9-12.
Figure 14:
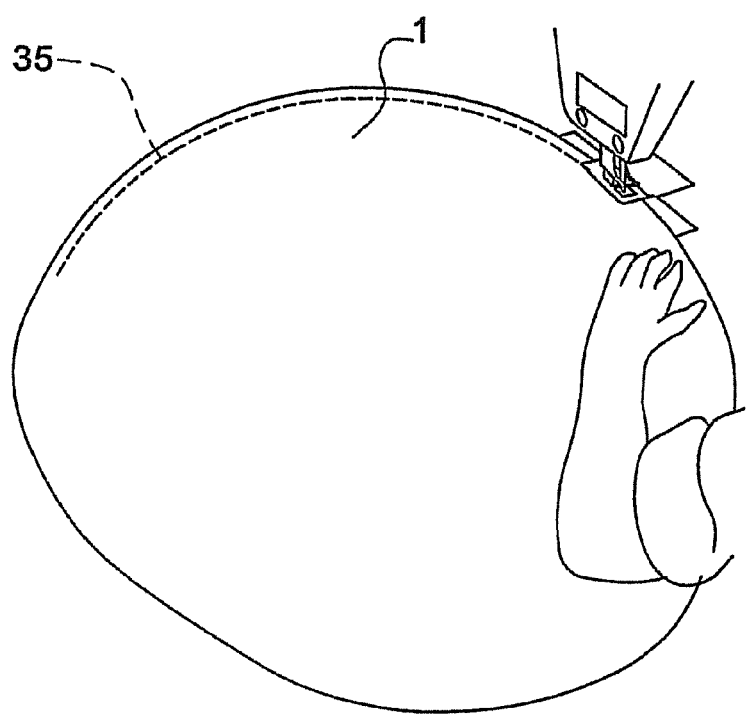
FIG. 14 shows the front and rear panels being connected to one another around their peripheries.

As shown in FIG. 13, the front panel 1 is then superimposed over the partially completed air-bag structure illustrated in FIGS. 10-12 and is arranged such that the outer periphery of the front panel 1 is aligned with the outer periphery of the first sub-panel 7. The index notch 3 of the front panel 1 is aligned with the respective corresponding index notches 8, 23 of the rear panel 7, 20 whilst the index projection 4 of the front panel 1 is similarly aligned with the index projections 9, 24 of the rear panel 7, 20. As will be appreciated, having regard to FIGS. 1 and 2, with the front panel 1 and the first sub-panel 7 arranged in this manner, the warp and weft yarns 5,6 of the front panel 1 make an angle of approximately 45° to the warp and weft yarns 10,11 of the first sub-panel 7. Similarly, the warp and weft yarns 5,6 of the front panel 1 make an angle of approximately 45° to the warp and weft yarns 26,27 of the second sub-panel 20. The front panel 1 is then secured to the two sub-panels 7,20 by a peripheral line of stitching 35 as illustrated in FIG. 14.

Figure 15:
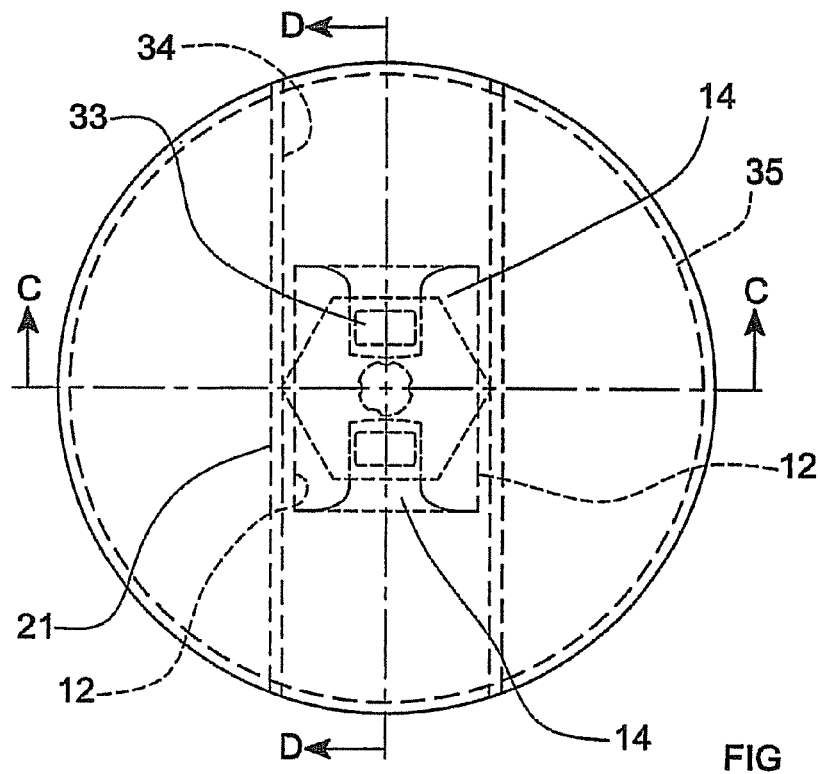
FIG. 15 is a partial cross-sectional view illustrating the partially constructed air-bag resulting from the connection step illustrated in FIG. 14.
Figure 16:
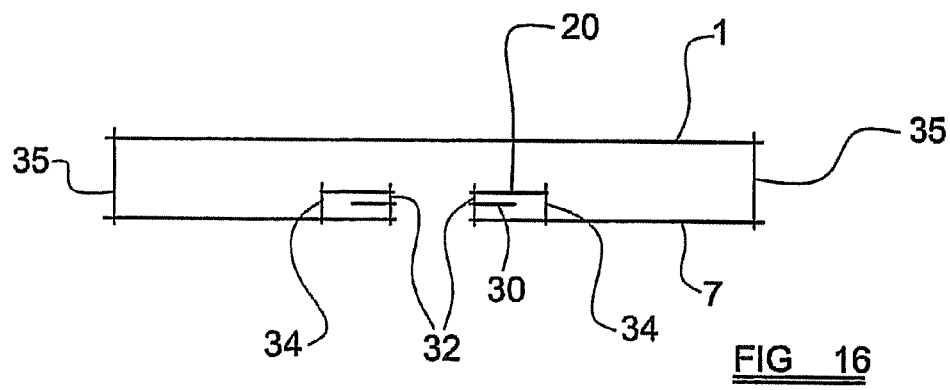
FIG. 16 is a schematic sectional view of the partially constructed air-bag, taken along line C-C in FIG. 15.
Figure 17:
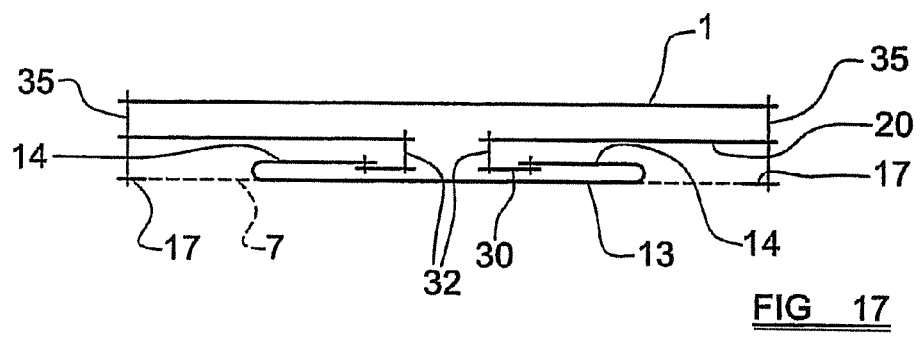
FIG. 17 is a schematic sectional view illustrating the partially constructed air-bag, taken along line D-D in FIG. 15.

FIG. 15 illustrates the resulting structure, with FIG. 16 showing the arrangement viewed in schematic cross-section along line C-C, and FIG. 17 illustrating the arrangement in schematic cross-section along line D-D.

Figure 18:
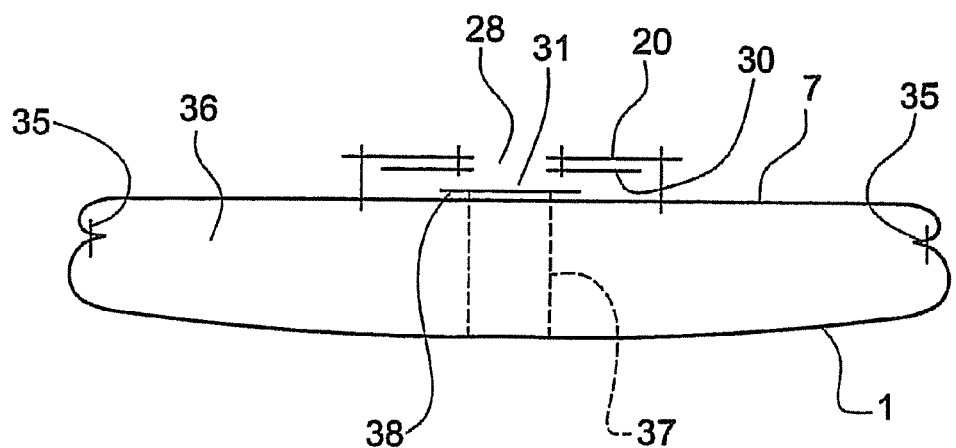
FIG. 18 is a view corresponding generally to FIG. 16, but illustrating the partially constructed air-bag having been turned inside out.
Figure 19:
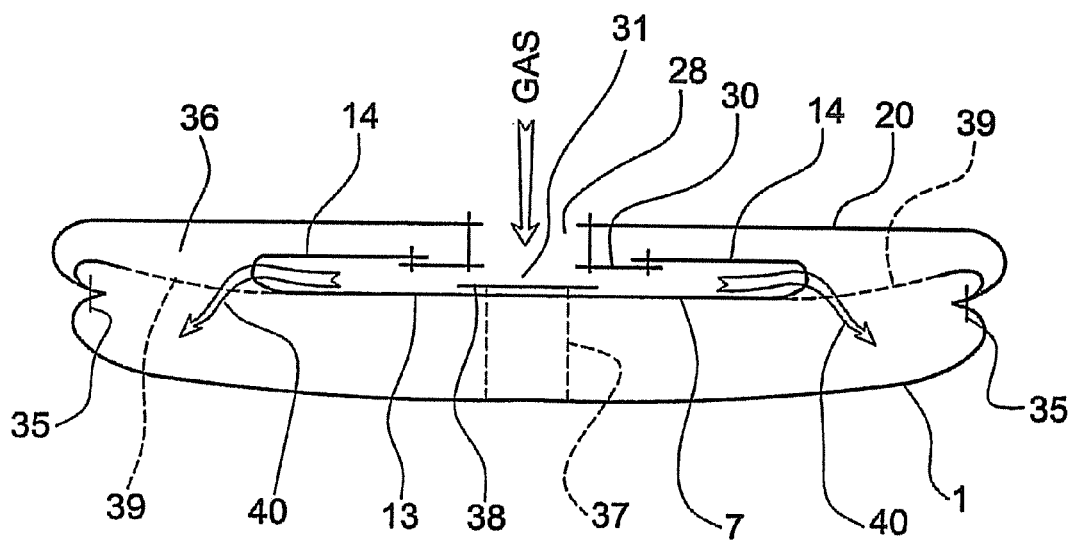
FIG. 19 is a view corresponding generally to that of FIG. 17, but illustrating the partially constructed air-bag having been turned inside out.

The structure illustrated in FIGS. 15-17 is then turned inside out, through the gas-inlet apertures 28,31 of the second sub-panel 20 and the heat shield 30. The resulting structure takes the form generally as illustrated in FIGS. 18 and 19. FIG. 18 is a view corresponding generally to that of FIG. 16, whilst FIG. 19 is a view corresponding generally to that of FIG. 17.

Figure 20:
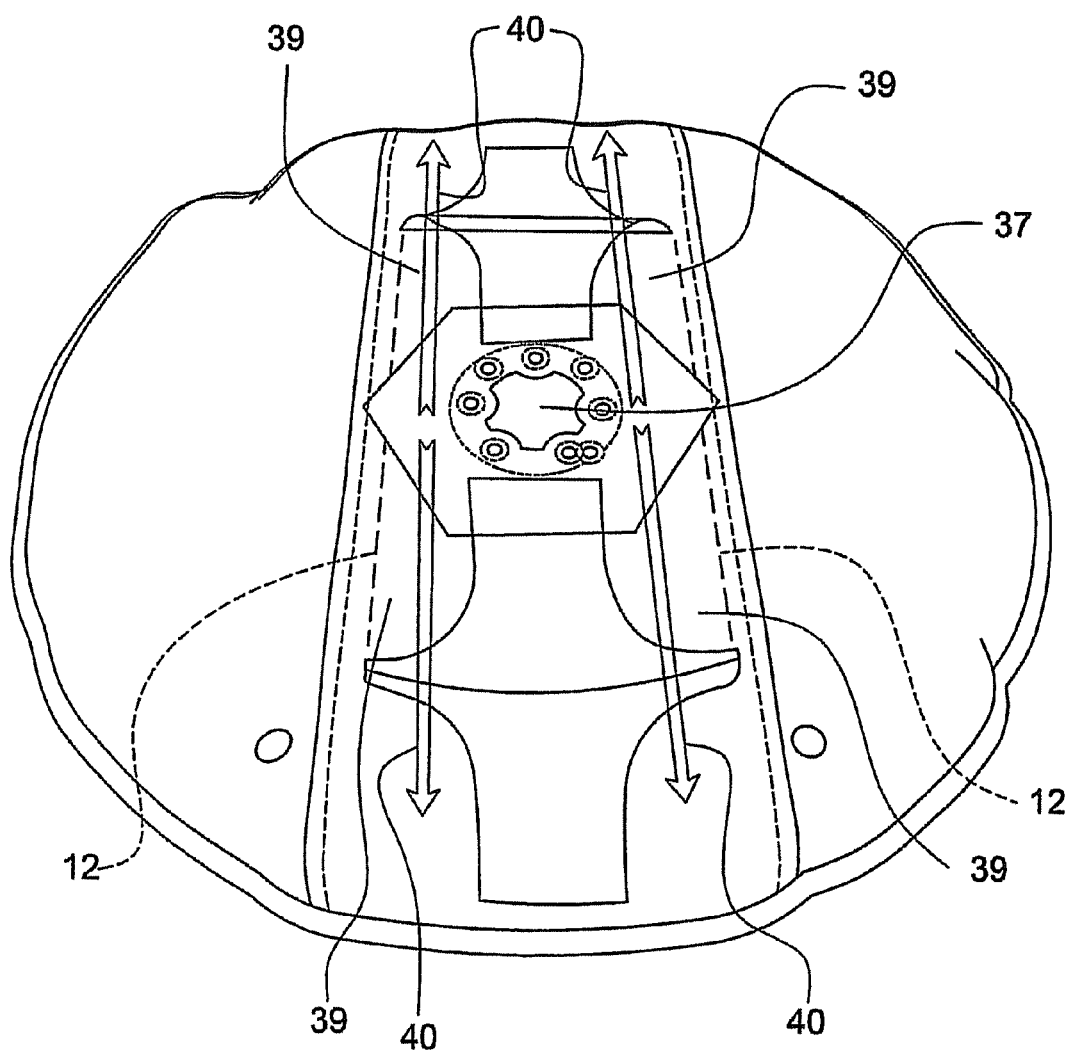
FIG. 20 shows the substantially completed air-bag of the first embodiment.

As will be seen, the result of turning the structure inside out is that the peripheral line of stitching 35 interconnecting the rear panel (made up of the two sub-panels 7,20) and the front panel 1 becomes located inside the internal inflatable volume 36 of the resulting air-bag. The central region of the first sub-panel 7, which defines the tether 13, is then connected to the front panel 1 via a circular line of stitching 37 which is created using the aligned gas-inlet apertures 28,31 for access. An optional fabric reinforcing element 38 can be secured to the first sub-panel 7 via the circular line of stitching 37 to provide additional reinforcement to this region of the air-bag structure. The resulting air-bag arrangement is illustrated in FIG. 20, and the function of the tether 13 is most readily understood from consideration of FIGS. 19 and 20.

As will therefore be appreciated, the air-bag of the first embodiment comprises a rear panel made up of interconnected sub-panels 7,20 and a front panel 1, the rear panel and the front panel being secured to one another by the peripheral seam 35 so as to define the inflatable volume 36. The tether 13, with its folded back tether flaps 14, serves to interconnect the rear panel and the front panel 1.

During an initial stage of inflation of the air-bag, through the injection of a flow of inflating gas through the gas-inlet apertures 28,31 provided through the second sub-panel 20 and the heat shield 30, the central rectangular region of the tether 13 effectively serves as a gas deflector effective to direct the inward flow of inflating gas generally radially through flow passages 39 defined to each side of the tether flaps 14 (see FIG. 20), between the tether flaps 14 and the adjacent lines of slits or perforations 12. This radial flow of gas is indicated generally by the arrows 40 in FIGS. 19, 20, and it should be appreciated that in this stage of inflation, the central region of the tether 13 is urged away from the gas-inlet apertures 28,31 so as to assume the general shape of an inflated cylinder.

As indicated previously, the two lines of slits or perforations 12 effectively form regions of mechanical weakness in the tether 13, and these are arranged to rupture when the internal pressure of the inflating air-bag reaches a predetermined level. When the lines of slits or perforations 12 rupture in this manner, the sides of the inflated cylinder are opened up allowing the inflating gas to act directly on the front panel 1 of the air-bag. The tether 13 is thus arranged so as to have a first configuration, in which the lines of slits or perforations 12 remain intact and in which the tether is effective to restrict movement of the front panel 1 away from the rear panel during an initial stage of inflation; and to adopt a second configuration upon rupture of the lines of slits or perforations 12, in which the front panel 1 is allowed to move further away from the rear panel during a subsequent stage of inflation of the air-bag.

Figure 35A:
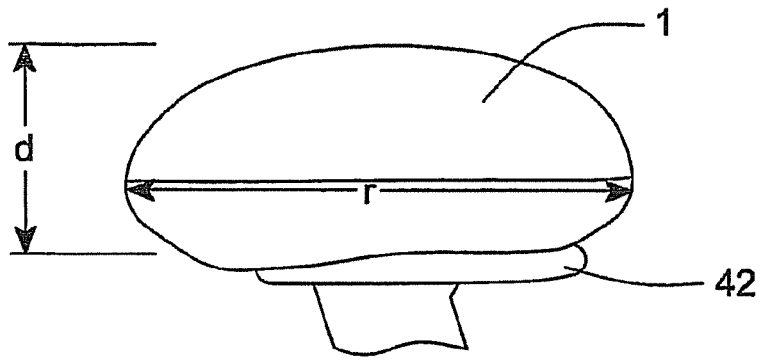
FIG. 35 shows an air-bag in accordance with the present invention at three successive stages during inflation, viewed from the side.
Figure 35B:
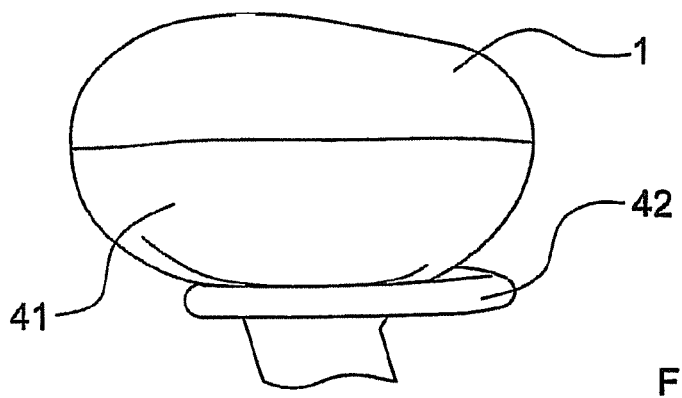
Figure 35C:
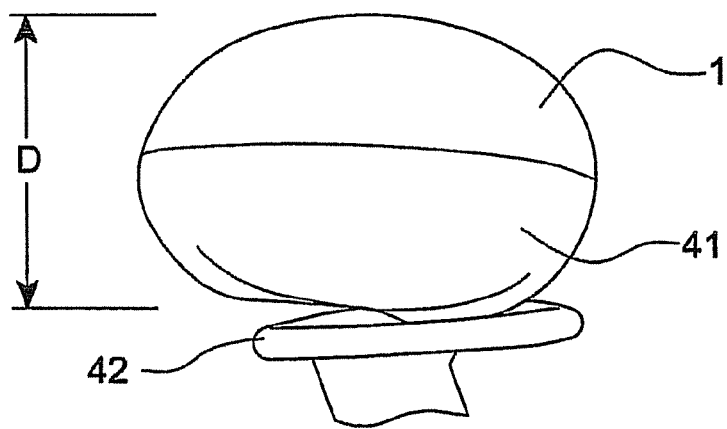

FIG. 35 illustrates three successive stages of inflation of an air-bag having the sort of tether structure described above. FIG. 35a illustrates the air-bag in a partially inflated stage where the internal pressure of the inflating gas within the air-bag is below the aforementioned predetermined level. At this stage of inflation, the tether 13 has its first configuration in which the areas of mechanical weakness defined by the lines of slits or perforations 12 remain substantially intact, with the result that the central region 13 of the tether acts as a gas deflector. The air-bag thus quickly attains an initial predetermined depth d and quickly attains full radial coverage as denoted by dimension r. FIG. 35b illustrates the air-bag during a subsequent stage of inflation as the tether 13 begins to rupture, and it will be seen that the front panel 1 of the air-bag begins to move further away from the rear panel 41 because the internal flow of gas is no longer restricted to being substantially radial and instead begins to bear directly on the front panel 1. FIG. 35c illustrates the air-bag in a substantially fully inflated condition in which it has achieved its maximum depth D.

As will be appreciated, the inflation characteristic illustrated in FIG. 35 is advantageous in addressing the problem of "bag-slap" because the air-bag quickly attains substantially complete radial coverage, extending over the entire extent of the steering wheel 42, but movement of the front panel 1 towards seat occupants, and away from the steering wheel 42, is initially restricted, the front panel 1 only being allowed to move beyond the stage illustrated in FIG. 35a when the tether 13 ruptures during the subsequent stage of inflation.

An air-bag arrangement in accordance with a second embodiment of the present invention will now be described in detail with reference to FIGS. 21-34.

Figure 21:
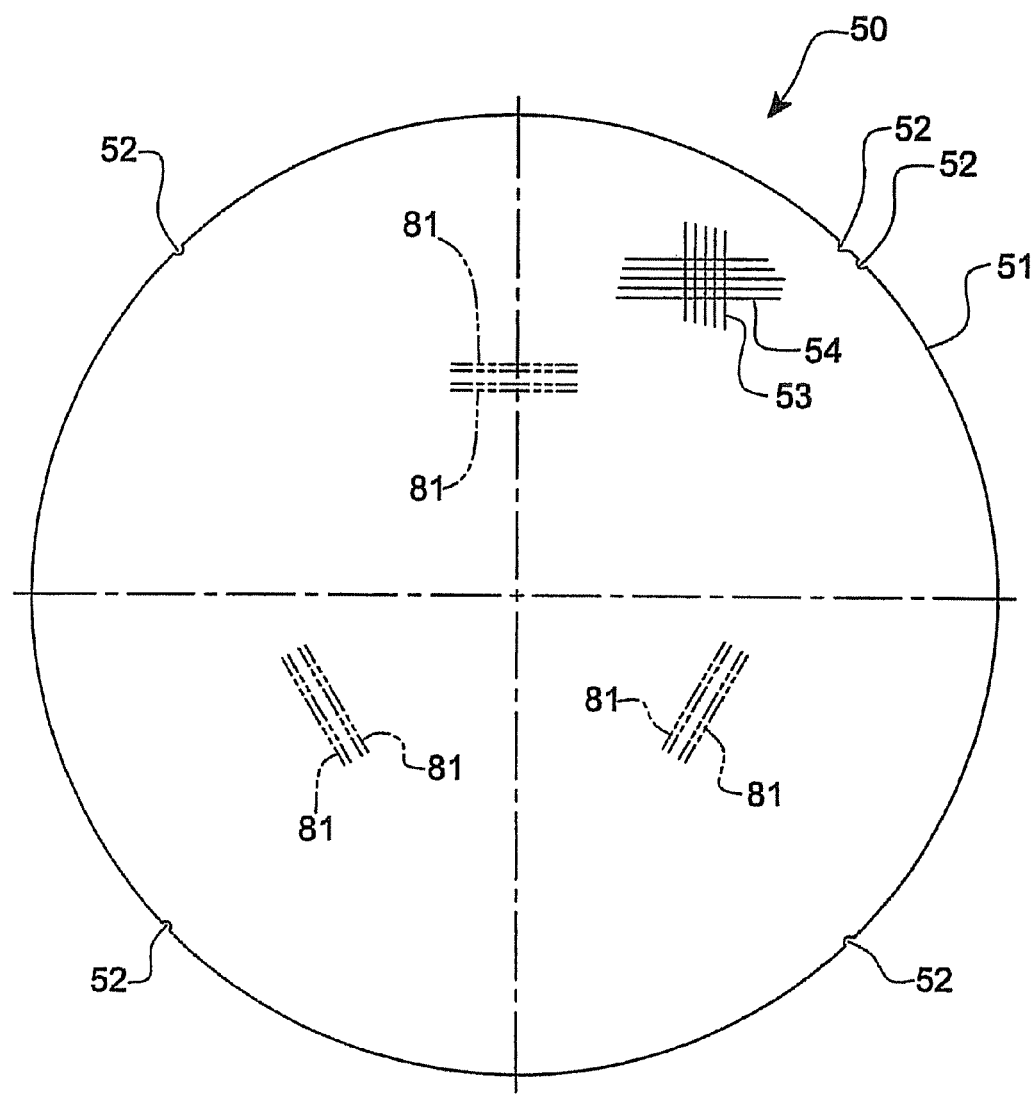
FIG. 21 shows a front panel used to form part of an air-bag in accordance with a second embodiment of the present invention.

Referring initially to FIG. 21, there is illustrated a front panel 50 which is cut from a layer of woven fabric so as to have a substantially circular form. At positions around the peripheral edge 51 of the front panel 50, there are provided a series of index notches 52 in an irregular array. In the orientation of the front panel 50 illustrated in FIG. 21, the warp yarns 53 and the weft yarns 54 of the fabric are arranged so as to run parallel with the vertical and transverse axes of the front panel 50 (or vice versa).

Figure 22:
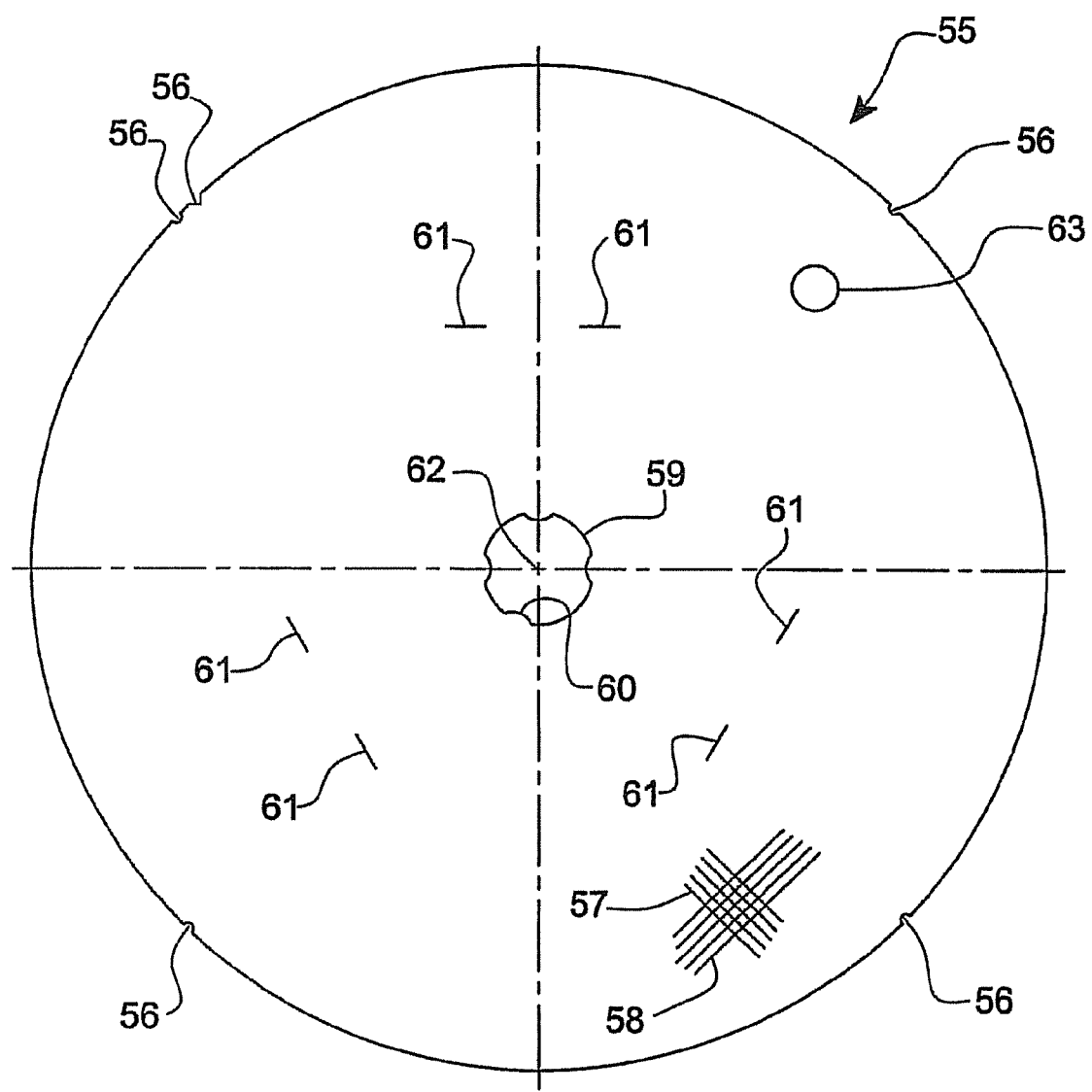
FIG. 22 illustrates a rear panel used to form part of the air-bag of the second embodiment.

FIG. 22 illustrates a rear panel 55 which is again cut from a layer of fabric so as to have a substantially circular form of substantially equal diameter to the front panel 50. The peripheral edge of the rear panel 55 is provided with a plurality of index notches 56 in an irregular array corresponding to the arrangement of the index notches 52 around the front panel 50. In the orientation of the rear panel 55 illustrated in FIG. 22, it should be appreciated that the warp yarns 57 and the weft yarns 58 of the fabric are arranged so as to make an angle of approximately 45° to the vertical and transverse axes of the rear panel 55.

The rear panel 55 is provided with a central gas-inlet aperture 59 having a form similar to that provided through the second sub-panel 20 of the first embodiment illustrated in FIG. 3. It will thus be appreciated that the gas-inlet aperture 59 has a plurality of inwardly directed projections 60 arranged in an irregular array to allow for correct alignment with a gas generator (not shown).

Six straight slits 61 are provided through the fabric of the rear panel 55, and are arranged in pairs such that the slits of each pair are spaced apart from one another and lie on the same side of a notional equilateral triangle centred on the centre point 62 of the circular panel.

A small vent aperture 63 can be provided through the fabric of the rear panel 55, in a manner known per se.

Figure 23:
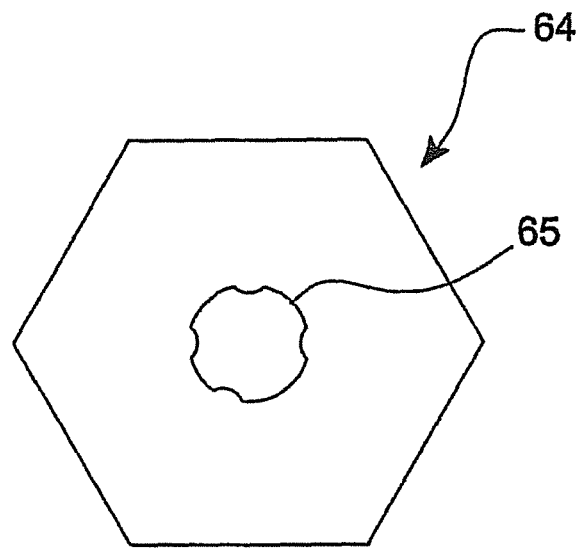
FIG. 23 illustrates a heat shield used to form part of the air-bag of the second embodiment.

FIG. 23 illustrates a fabric heat shield 64 which is substantially identical to the heat shield 30 of the first embodiment and hence preferably takes the form of a substantially regular hexagon, having a central gas-inlet aperture 65 of substantially identical form to the gas-inlet aperture 59 provided through the rear panel 55. As will be appreciated, however, it is envisaged that heat shields of other form could be used such as, for example, square or rectangular heat shields.

Figure 24:
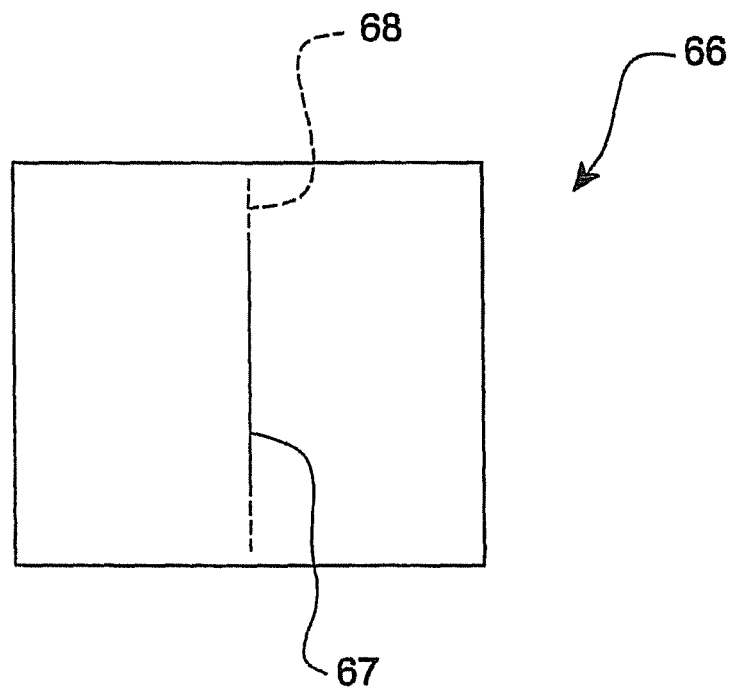
FIG. 24 illustrates a tether attachment element used in the air-bag of the second embodiment.

FIG. 24 illustrates a fabric tether attachment element 66 which has a substantially rectangular form and is provided with an elongate slit 67 along a transverse centrally located fold line 68.

Figure 25:
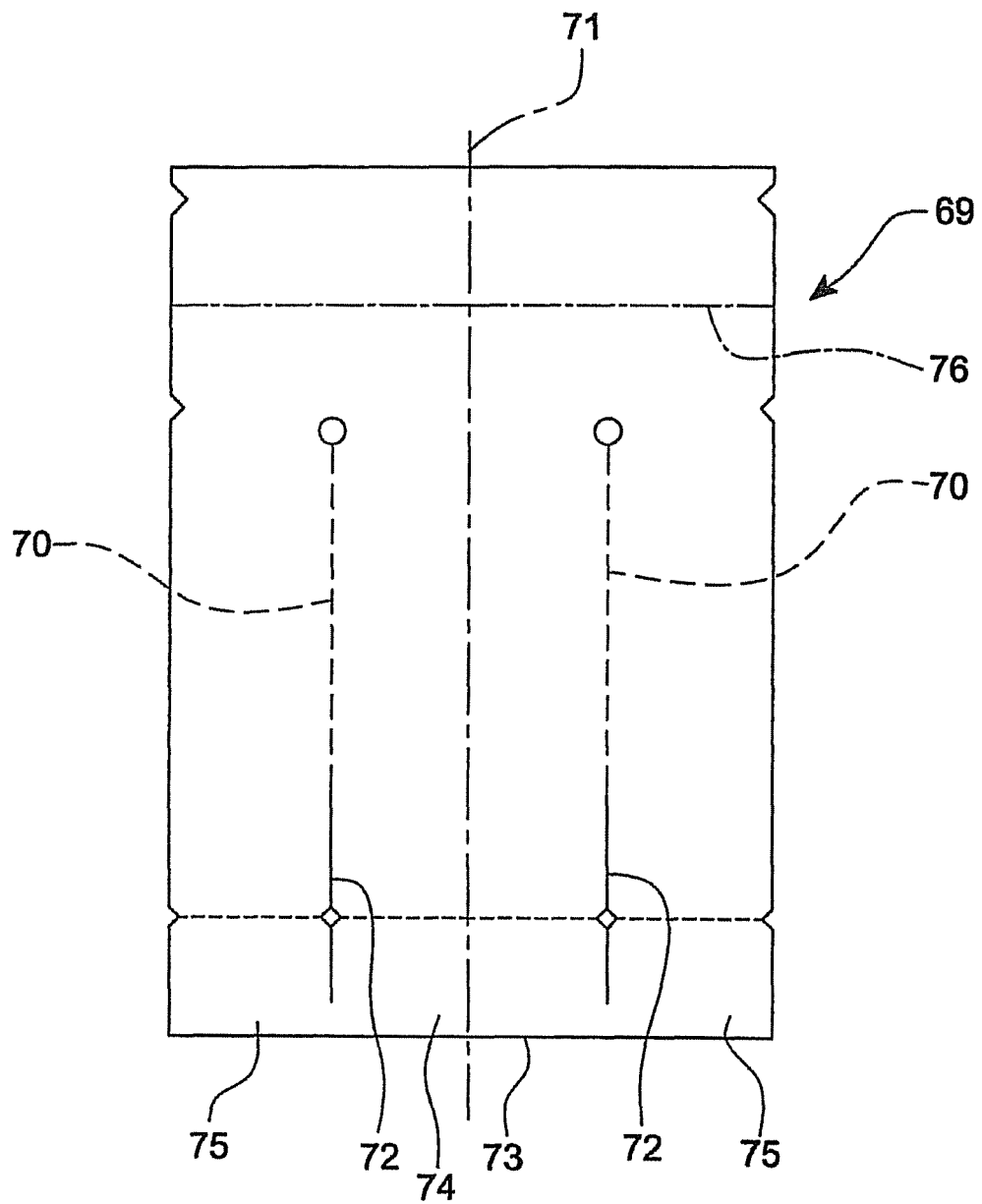
FIG. 25 illustrates a tether used in the air-bag of the second embodiment.

FIG. 25 illustrates a fabric tether 69 which has a substantially rectangular form. Two spaced apart lines of slits or perforations 70 are provided through the fabric of the tether 69 in a substantially central region of the tether, the lines of slits or perforations 70 being provided to either side of a central longitudinal axis 71. A pair of linear cuts 72 are provided through the fabric of the tether 69, each cut 72 being substantially collinear with a respective line of slits or perforations 70 and running from the respective line of slits or perforations 70 to the lower end edge 73 of the tether 69. The cuts 72 thus divide the lower region of the tether 69 (in the orientation illustrated in FIG. 25) into a central tab 74 and a pair of lugs 75 located to either side of the central tab 74.

Figure 26:
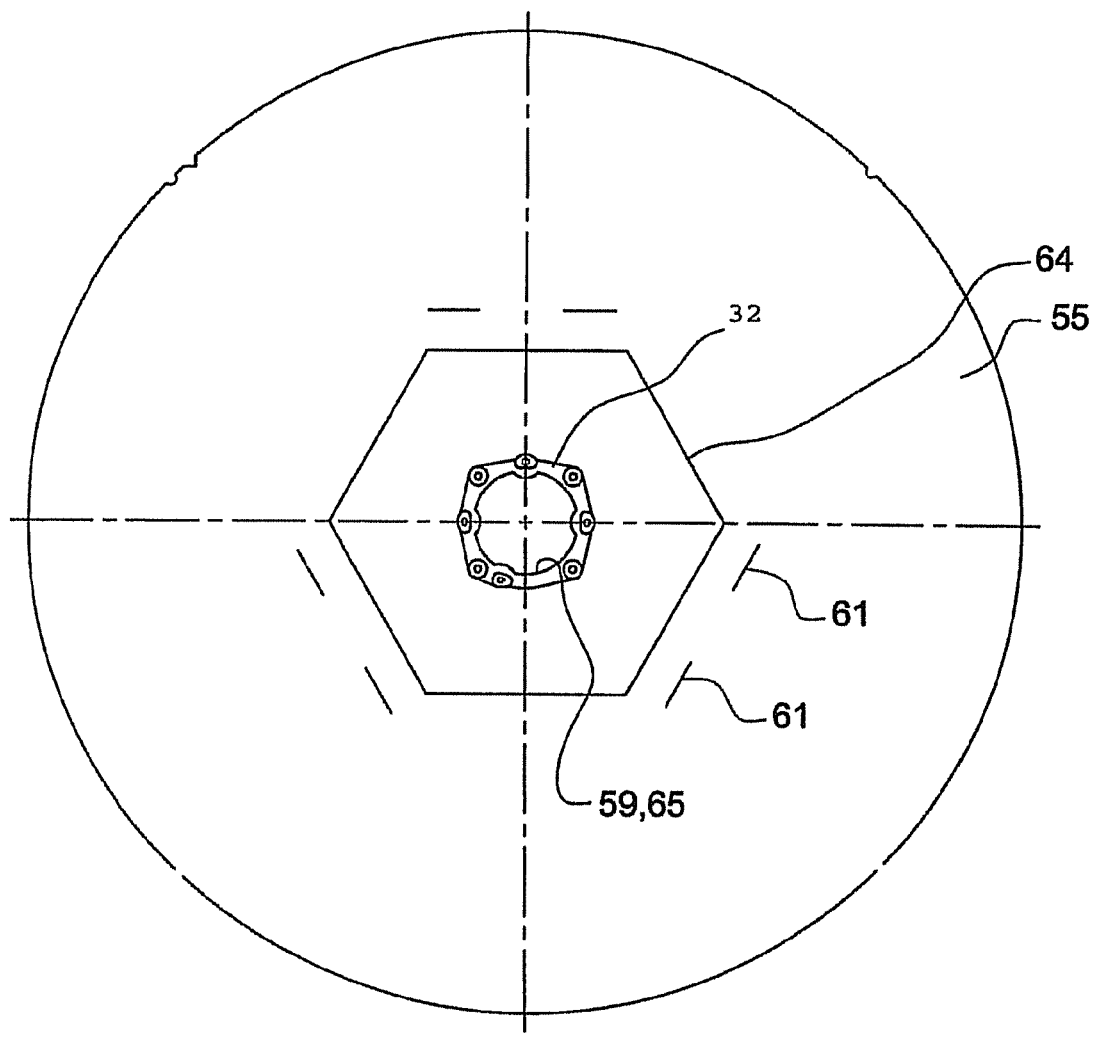
FIG. 26 shows the heat shield of FIG. 23 secured to the rear panel of FIG. 22.

FIG. 26 illustrates an early stage in the fabrication of an air-bag in accordance with the second embodiment of the present invention, and shows the heat shield 64 superimposed on the rear panel 55 such that the central gas-inlet aperture 65 of the heat shield 64 is aligned with the central gas-inlet aperture 59 of the rear panel 55. The heat shield 64 and the rear panel 55 are secured to one another in this orientation by a tortuous line of stitching 32 in a manner which will be understood from the first embodiment described above. Although the embodiment illustrated comprises only a single heat shield element 64, it should be appreciated that alternative arrangements could comprise two or possibly even more superimposed heat shield elements 64.

Figure 27:
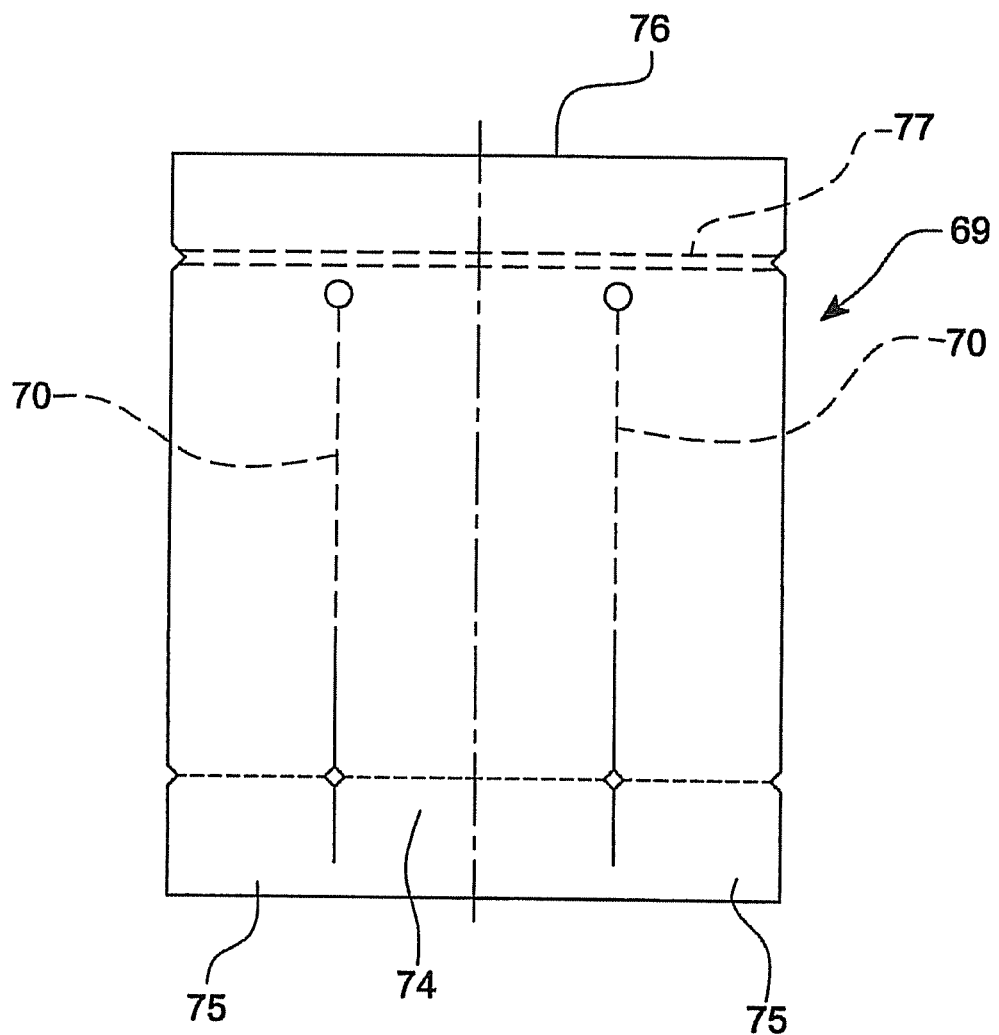
FIG. 27 shows the tether of FIG. 25 having been folded and stitched.

Turning now to consider FIG. 27, the tether 69 is shown with the uppermost region of the tether, beyond the extent of the slits or perforations 70, having been folded about a fold line 76 so as to have a double thickness. The two thicknesses of the fabric tether 69 are then secured to one another in this region via one or more lines of stitching 77 running transversely across the tether 69. In the illustrated embodiment, three tethers 69 are used, and each is folded and stitched in the manner illustrated in FIG. 27.

Figure 28:
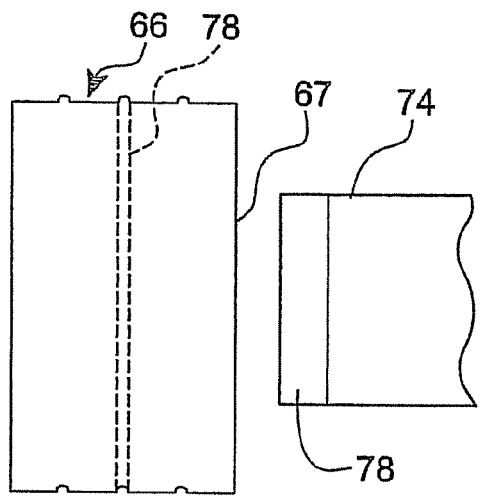
FIG. 28 shows the tether attachment of FIG. 24 having been folded, and also shows part of the tether illustrated in FIG. 27.
Figure 29:
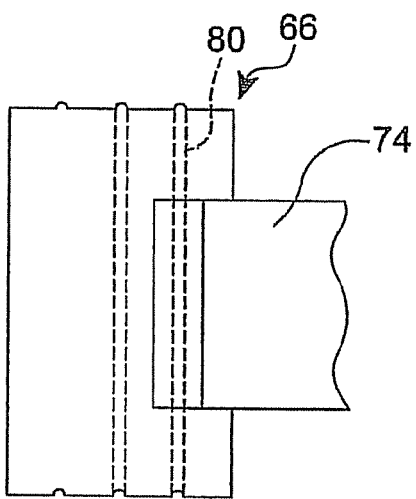
FIG. 29 shows the tether and the tether attachment having been interconnected.

Similarly, three fabric tether attachment elements 66 are used in the illustrated embodiment, and each of these must be folded about the central fold line 68 so as to take on the configuration illustrated in FIG. 28. When each of the tether attachments 66 has been folded in this manner, the two thicknesses of fabric are secured to one another via one or more lines of stitching 78 running across a central region of the folded element. As will be appreciated, a small pocket is thus defined between the two layers of fabric of the folded tether attachment 66, with the slit 67 forming an opening to the pocket. The end region of the central tab 74 of a respective tether 69 is then folded over so as to have a double thickness, with the double thickness region 78 then being inserted through a respective slit 67 so as to be accommodated within the pocket of a respective tether attachment element 66. Each tether attachment element 66 is then secured to the central tab 74 of a respective tether via a line of stitching 80 as illustrated in FIG. 29.

Figure 30:
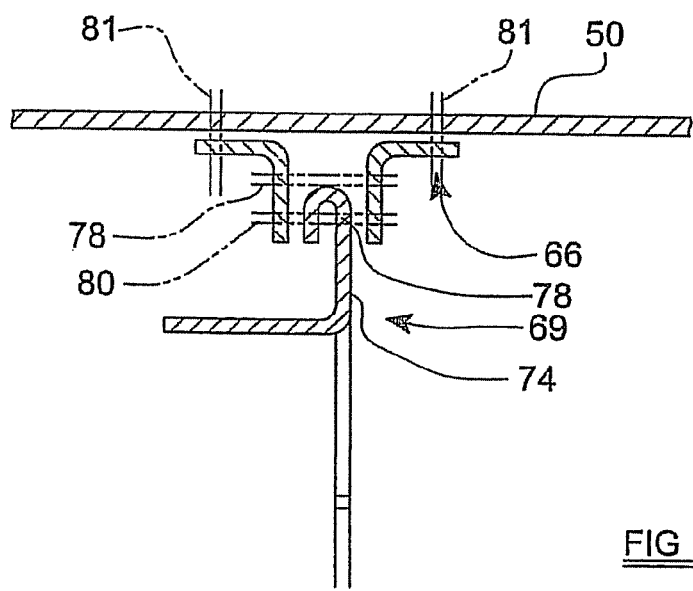
FIG. 30 is a cross-sectional view showing the tether attachment, and the tether, secured to the front panel of the air-bag.

Each tether 69 is then secured to the front panel 50, via its associated tether attachment 66 in the manner illustrated in FIG. 30. As can be seen in FIG. 30, the unstitched region of the folded tether attachment 66 can be opened up, with the two layers of fabric being pulled apart from one another so as to extend in opposite directions, whereupon each layer of fabric can be secured to the front panel 50 via respective lines of stitching 81. The orientation and location of the lines of stitching 81 are illustrated schematically in FIG. 21, and it can be seen from this figure that each pair of lines 81 are arranged along the sides of a notional equilateral triangle centred on the centre point of the front panel 50. As will therefore be appreciated, the three tethers 69 are thus secured to respective regions (defined by the pairs of stitch lines 81) of the front panel 50, those regions being substantially equi-spaced from one another in a substantially regular array.

Figure 31:
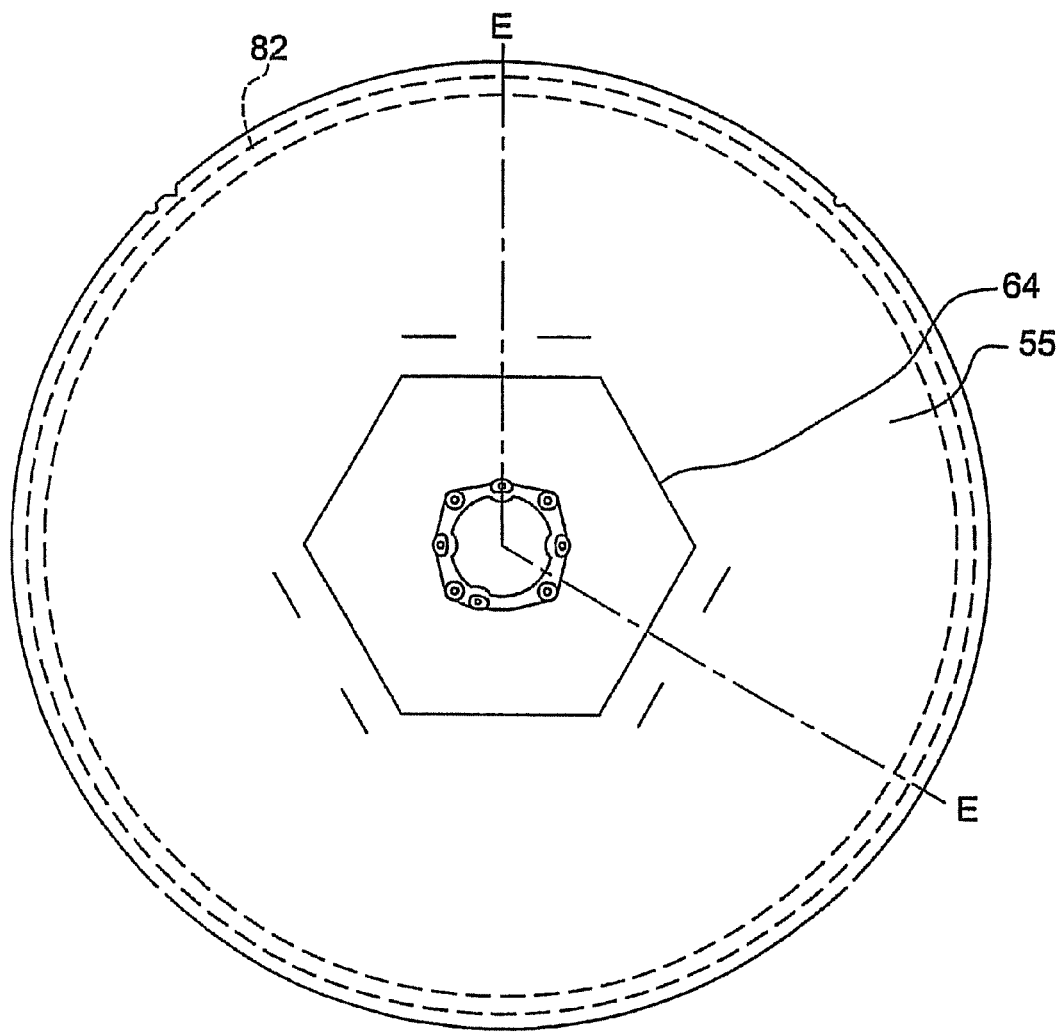
FIG. 31 shows the front and rear panels of the air-bag having been connected to one another about their peripheries.

As illustrated in FIG. 31, the rear panel 55, to which the heat shield 64 is attached, is then superimposed on the front panel 50, and the two panels are interconnected by one or more peripheral lines of stitching 82. As will be appreciated in particular from FIG. 32, the rear panel 55 is placed against the side of the front panel 50 opposite that to which the tethers 69 are attached via their respective tether attachments 68. In this configuration, the rear panel 55 lies between the heat shield 64 and the front panel 50. However, the arrangement is then turned inside out, through the gas-inlet apertures 59,65 formed in the rear panel 55 and heat shield 64, so as to adopt the general configuration illustrated in FIG. 33, in which the peripheral seam 82 is located inside the interior volume 83 of the resulting air-bag. As will also been seen from FIG. 33, the heat shield 64 becomes located within the interior volume 83 when the air-bag arrangement is turned inside out in the manner described above.

Each tether 69 is then secured to the rear panel 55 by folding over the end region of each lug 75 so as to form a double thickness of fabric, and inserting each folded over lug 75 through a respective slit 61 formed through the rear panel 55. The lugs 75 are secured to the fabric of the rear panel 55 by pulling the fabric of the rear panel 55 in the immediate region of each slit 61 outwardly, and stitching the two layers of rear panel fabric and the folded over lug 75 to each other via lines of stitching 84 in the manner illustrated in FIG. 33.

Figure 34:
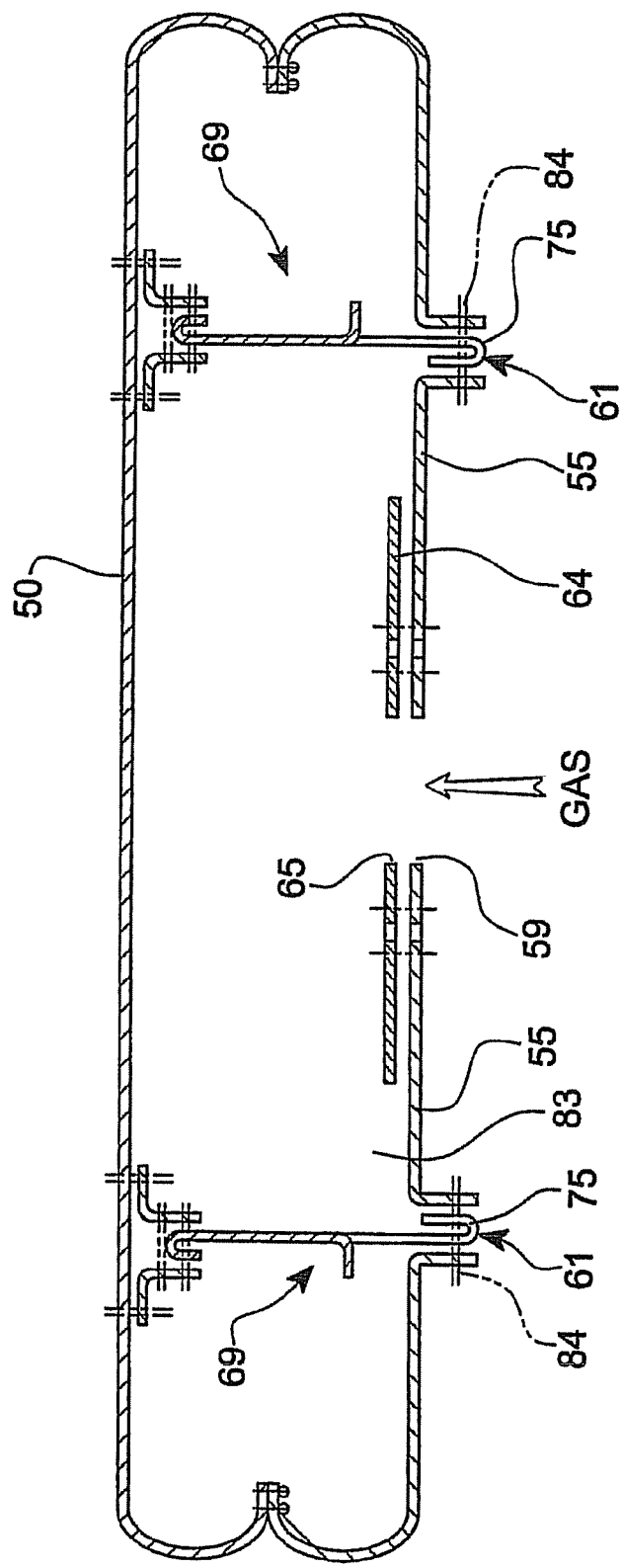
FIG. 34 is a view corresponding generally to that of FIG. 33, but illustrating the air-bag in an inflated condition.

When the arrangement illustrated in FIG. 33 is inflated, by the injection of a flow of inflating gas through the gas-inlet apertures 59,65, the three internal tethers 69 are each in an initial configuration in which their lines of slits or perforations 70 remain substantially intact. This is the condition illustrated in FIG. 33 where the effective length of each tether 69 is limited by the lines of slits or perforations 70. The tethers 69 thus each serve to limit the maximum depth that the inflating air-bag can achieve, measured between the front and rear panels 50,55, during an initial stage of inflation. However, when the internal pressure of the air-bag reaches a predetermined value, the lines of slits or perforations 70 rupture, which allows each tether 69 to extend as illustrated in FIG. 34, thereby adopting a second configuration in which the maximum depth of the air-bag is allowed to increase further. This tether arrangement thus provides a similar inflation characteristic to that illustrated in FIG. 35, albeit without providing the gas deflector function of the first embodiment described above with regard to FIGS. 1-20, because in the arrangement of the second embodiment, the flow of gas into the interior volume of the air-bag, through the gas-inlet apertures 59,65 is allowed to impinge directly on the front panel 50.

Although the second embodiment described above with reference to FIGS. 21-34 has been shown to comprise three substantially equi-spaced tethers, it is to be appreciated that this arrangement could be modified by the provision of fewer or more tethers of similar construction. For example, it is envisaged that a four-tether arrangement could be provided in which the four tethers are secured to the front and rear panels in regions arranged in a substantially square array rather than in the substantially triangular array illustrated in the drawings.

Figure 36:
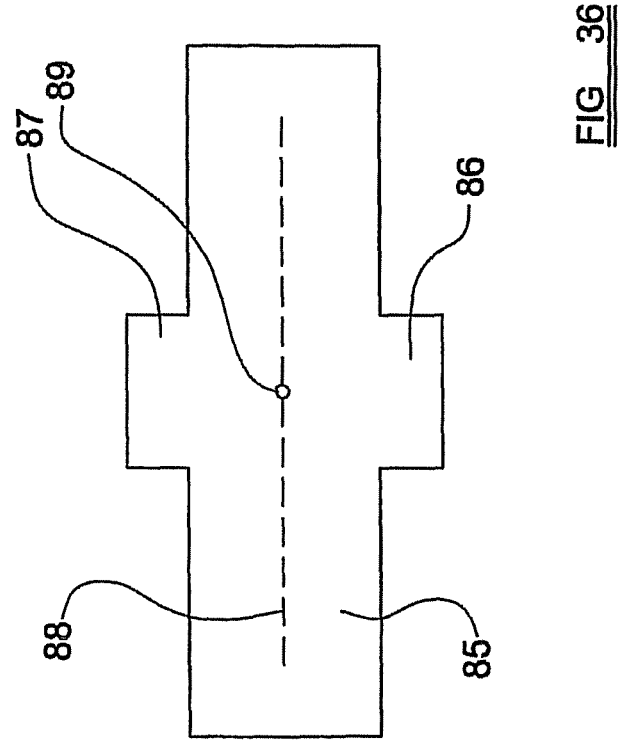
FIG. 36 shows an alternative form of tether arrangement suitable for use in the three-tether arrangement shown in FIGS. 21-34 in an initial substantially intact configuration.

FIG. 36 illustrates an alternative form of tether 85 suitable for use in an air-bag arrangement similar to that described above and shown in FIGS. 21-34. As can be seen, the alternative form of tether 85 is generally elongate and has a cruciform configuration. A first region 86 of the tether projects outwardly from the main rectangular region and is provided for connection to the rear panel 55 of the air-bag, whilst an oppositely directed region 87 is provided for connection to the front panel 50 of the air-bag. A single region of mechanical weakness is provided by way of a straight line of slits or perforations 88 which extends transversely across the central region of the tether 85 so as to pass between the two regions 86, 87 of the tether which are connected to the rear and front panels respectively. The line of slits or perforations 88 is preferably provided along the transverse axis of mirror-symmetry of the tether 85.

A small hole 89, or alternatively a small cross-slit is provided substantially half-way along the line of slits of perforations 88.

Figure 37:
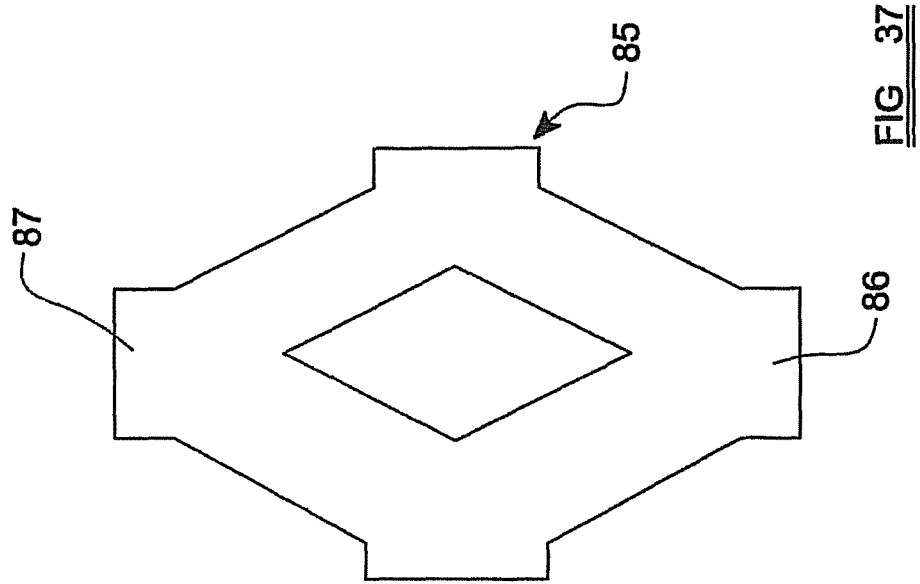
FIG. 37 illustrates the tether shown in FIG. 36 schematically in a second configuration following rupture during inflation of the air bag.

As will be appreciated, during an initial stage of inflation of an air-bag incorporating the modified tether 85 shown in FIG. 36, the line of slits or perforations 88 remains substantially intact, thereby limiting the maximum depth of the inflating air-bag as a function of the initial distance separating the regions 86, 87 which are connected to the rear and front panels of the air-bag. However, when the internal pressure of the air-bag reaches a predetermined level, the line of slits or perforations 88 will rupture. In this regard, due to be noted that the central aperture 89 or cross-slit is intended to ensure that the line of slits or perforations 88 initially begins to rupture in the central region, with a tear propagating outwardly to either side of the central region. FIG. 37 illustrates, schematically, the configuration of the tether 85 following rupture of the line of slits or perforations 88, and it can be seen from this figure that the distance separating the regions 86, 87 of the tether which are connected to the front and rear panels of the air-bag has increased significantly, thereby allowing an increase in the maximum depth of the air-bag in the same manner as the embodiments described above.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

When used in this specification and claims, the terms "comprises" and "comprising" and variations thereof mean that the specified features, steps or intrudes are included. The terms are not to be interpreted to exclude the presence of other features, steps or components.

The features disclosed in the forgoing description, or the filing claims, or the accompanying drawings, expressed in their specific forms or in terms of a means of performing a disclosed function, or a method or process for attaining the disclosed results, as appropriate, may, separately, or in any combination of such features, be utilised for realising the invention in diverse forms thereof.

The invention claimed is:

1. An air-bag comprising:
   a rear panel and a front panel secured to one another to define an inflatable volume; and
   a tether interconnecting the front and rear panels, the tether having an area of mechanical weakness, the tether having a first configuration prior to rupture of the area of mechanical weakness, and a second configuration after rupture of the area of mechanical weakness, the first configuration of the tether effective during inflation of the air-bag to limit the maximum depth of the air-bag to a predetermined distance between the front and rear panels, the second configuration effective to allow an increase in the maximum depth of the air-bag beyond the predetermined distance,
   wherein the tether is configured in its first configuration to act as a gas-deflector to the flow of gas entering the interior volume of the air-bag through a gas-inlet aperture provided through the rear panel.

2. The air-bag according to claim 1, wherein the area of mechanical weakness is configured to rupture in response to inflation of the air-bag to a predetermined internal pressure.

3. The air-bag according to claim 1, wherein the tether is formed of fabric.

4. The air-bag according to claim 1, wherein the area of mechanical weakness is defined by at least one line of slits or perforations.

5. The air-bag according to claim 4, wherein the tether comprises two spaced apart lines of slits or perforations.

6. The air-bag according to claim 5, wherein the spaced apart lines are substantially parallel to one another.

7. The air-bag according to claim 6, wherein a pair of linear cuts are provided through the tether, each cut being substantially collinear with a respective line of slits or perforations, so as to define a tab between the cuts and a respective lug to the other side of each cut, the tether being secured to one of the panels via the tab, and being secured to the other panel via the pair of lugs.

8. The air-bag according to claim 5, wherein a pair of linear cuts are provided through the tether, each cut being substantially collinear with a respective line of slits or perforations, so as to define a tab between the cuts and a respective lug to the other side of each cut, the tether being secured to one of the panels via the tab, and being secured to the other panel via the pair of lugs.

9. The air-bag according to claim 5, wherein a region of the tether located between the lines is secured to the front panel.

10. The air-bag according to claim 9, wherein the rear panel is formed by two interconnected sub-panels, the tether being formed integrally with a first of the sub-panels.

11. The air-bag according to claim 10, wherein the lines of slits or perforations are provided through the first sub-panel.

12. The air-bag according to claim 11, wherein the lines of slits or perforations extend over a substantially central region of the first sub-panel between a pair of flaps cut from the first sub-panel, each flap being turned behind the central region and secured relative to a gas-inlet aperture provided through the rear panel.

13. The air-bag according to claim 12, wherein each flap defines at least one gas-flow passage extending outwardly from the gas-inlet aperture in a direction substantially aligned with the lines of slits or perforations.

14. The air-bag according to claim 12, wherein the tether forms a substantially central region of the first sub-panel, and wherein the second sub-panel is connected to the first sub-panel so as to extend across the central region of the first sub-panel, and further wherein the gas-inlet aperture is provided through the second-sub-panel.

15. The air-bag according to claim 11, wherein the tether forms a substantially central region of the first sub-panel, and wherein the second sub-panel is connected to the first sub-panel so as to extend across the central region of the first sub-panel, and further wherein the second sub-panel is connected to the first sub-panel via a pair of spaced apart lines of stitching, and wherein the lines of slits or perforations both lie between the lines of stitching, with each line of slits or perforations lying substantially adjacent a respective line of stitching.

16. The air-bag according to claim 11, wherein the tether forms a substantially central region of the first sub-panel, and wherein the second sub-panel is connected to the first sub-panel so as to extend across the central region of the first sub-panel, and further wherein the second sub-panel is connected to the first sub-panel via a pair of spaced apart lines of stitching, and wherein the lines of slits or perforations both lie between the lines of stitching, with each line of slits or perforations lying substantially adjacent a respective line of stitching.

17. The air-bag according to claim 10, wherein the tether forms a substantially central region of the first sub-panel, and wherein the second sub-panel is connected to the first sub-panel so as to extend across the central region of the first sub-panel.

18. The air-bag according to claim 10, wherein the lines of slits or perforations are provided through the first sub-panel.

19. The air-bag according to claim 9, wherein the rear panel is formed by two interconnected sub-panels, the tether being formed integrally with a first of the sub-panels.

20. The air-bag according to claim 5, wherein a region of the tether located between the lines is secured to the front panel.

21. The air-bag according to claim 4, wherein the tether includes a line of slits or perforations extending transversely across a substantially central region of the tether so as to lie between a region of the tether connected to the front panel, and a region of the tether connected to the rear panel.

22. The air-bag according to claim 4, wherein the tether comprises two spaced apart lines of slits or perforations.

23. The air-bag according to claim 1, comprising a plurality of the tethers.

24. The air-bag according to claim 23, wherein each tether is secured to a respective region of the rear panel, the respective regions of the rear panel being substantially equi-spaced from one another in a substantially regular array centered on a gas-inlet aperture provided in a central region of the rear panel.

25. The air-bag according to claim 24, wherein the array of regions of the front panel substantially corresponds to the array of regions of the rear panel.

26. The air-bag according to claim 23, wherein each tether is secured to a respective region of the front panel, the regions of the front panel being substantially equi-spaced from one another in a substantially regular array.

27. The air-bag according to claim 23, comprising at least three tethers.

28. The air-bag according to claim 1, wherein the tether is formed integrally with at least a region of the rear panel.

29. An air-bag comprising:
   a rear panel and a front panel secured to one another to define an inflatable volume; and
   a tether interconnecting the front and rear panels, the tether having an area of mechanical weakness, the tether having a first configuration prior to rupture of the area of mechanical weakness, and a second configuration after rupture of the area of mechanical weakness, the first configuration of the tether effective during inflation of the air-bag to limit the maximum depth of the air-bag to a predetermined distance between the front and rear panels, the second configuration effective to allow an increase in the maximum depth of the air-bag beyond the predetermined distance,
   wherein the tether is configured in its first configuration to act as a gas-deflector to the flow of gas entering the interior volume of the air-bag through a gas-inlet aperture provided through the rear panel,
   wherein a region of the tether defined between the lines of slits or perforations overlies the gas-inlet aperture.

30. The air-bag according to claim 1, wherein the area of mechanical weakness is defined by at least one line of slits or perforations.

* * * * *